(12) United States Patent
Athey et al.

(10) Patent No.: US 7,904,753 B2
(45) Date of Patent: Mar. 8, 2011

(54) METHOD AND SYSTEM TO ELIMINATE DISRUPTIONS IN ENTERPRISES

(75) Inventors: William J. Athey, North Potomac, MD (US); Shailesh Joshi, New Milford, CT (US); Shallin Joshi, Brookfield, CT (US); David P. Ricci, Ocean Springs, MS (US)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 12/348,984

(22) Filed: Jan. 6, 2009

(65) Prior Publication Data

US 2010/0174949 A1 Jul. 8, 2010

(51) Int. Cl.
*G06F 11/00* (2006.01)
(52) U.S. Cl. .......................................................... 714/26
(58) Field of Classification Search ................ 714/26, 714/27
See application file for complete search history.

(56) References Cited

U.S. PATENT DOCUMENTS

| | | | |
|---|---|---|---|
| 6,434,715 B1 | 8/2002 | Andersen | |
| 6,591,166 B1* | 7/2003 | Millett et al. | 700/266 |
| 6,775,236 B1* | 8/2004 | Scrandis et al. | 370/241 |
| 6,795,935 B1* | 9/2004 | Unkle et al. | 714/37 |
| 6,856,942 B2 | 2/2005 | Garnett et al. | |
| 7,124,328 B2* | 10/2006 | Bowers et al. | 714/39 |
| 7,257,744 B2* | 8/2007 | Sabet et al. | 714/56 |
| 2002/0111755 A1* | 8/2002 | Valadarsky et al. | 702/58 |
| 2004/0049365 A1 | 3/2004 | Keller et al. | |
| 2004/0049565 A1* | 3/2004 | Keller et al. | 709/223 |
| 2004/0059966 A1* | 3/2004 | Chan et al. | 714/48 |
| 2005/0146426 A1* | 7/2005 | Pereira et al. | 340/506 |
| 2006/0041659 A1* | 2/2006 | Hasan et al. | 709/224 |
| 2006/0242467 A1 | 10/2006 | Dayen et al. | |
| 2006/0248389 A1* | 11/2006 | Thaler et al. | 714/26 |
| 2007/0203740 A1* | 8/2007 | Abu El Ata et al. | 705/1 |
| 2007/0240061 A1* | 10/2007 | Cormode et al. | 715/736 |
| 2008/0298229 A1* | 12/2008 | Ballantyne et al. | 370/218 |
| 2009/0049338 A1* | 2/2009 | Unnikrishnan et al. | 714/26 |
| 2010/0023604 A1* | 1/2010 | Verma et al. | 709/221 |
| 2010/0050023 A1* | 2/2010 | Scarpelli et al. | 714/46 |
| 2010/0052924 A1* | 3/2010 | Bajpay et al. | 340/635 |
| 2010/0111522 A1* | 5/2010 | Yang et al. | 398/17 |
| 2010/0192005 A1* | 7/2010 | Das et al. | 714/2 |

* cited by examiner

*Primary Examiner* — Bryce P Bonzo
(74) *Attorney, Agent, or Firm* — John Pivnichny; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to receive disruption data for an enterprise and determine optimal selected disruption data from the received disruption data. Additionally, the programming instructions are operable to correlate triggering events of the optimal selected disruption data to one or more systemic root cause categories and identify a systemic root cause based on the triggering events of the optimal selected disruption data. Furthermore, the programming instructions are operable to determine an optimal enterprise solution set based on the identified systemic root cause and determine an optimal enterprise transformation set based on the optimal enterprise solution set. Moreover, the programming instructions are operable to output the optimal enterprise transformation set for implementing the optimal enterprise transformation set in the enterprise.

25 Claims, 11 Drawing Sheets

METHOD AND SYSTEM TO ELIMINATE DISRUPTIONS IN ENTERPRISES

FIELD OF THE INVENTION

The present invention generally relates to eliminating disruptions in enterprises, and more particularly, to an optimal, adaptive method and system to eliminate disruptions in enterprises.

BACKGROUND

Enterprises comprise multiple systems. For example, an enterprise may be a business having a number of systems, e.g., a human resources system, a finance system, an ordering system and a marketing and sales system, amongst other systems. During operation of the enterprise, disruptions in any system or combination of systems may occur. Moreover, these disruptions in the system or combination of systems can disrupt the entire enterprise.

Current methods determine repairs to disruptions in individual systems of an enterprise. That is, conventionally, upon determining a disruption in an individual system of the enterprise, a repair is made to correct the individual system without attempting to determine a root cause for the individual system disruption. However, this repair may not be the optimal solution for the entire enterprise. For example, the repair made to correct the individual system may have corrected the individual system to the detriment of the overall enterprise, or may have corrected the individual system without solving the bigger problem of the enterprise, e.g., the systemic enterprise-wide root cause for the disruption to the enterprise.

Consequently, upon determining and performing repairs for disruptions in individual systems, in accordance with the conventional approach, the same disruption may occur randomly across all the systems causing the enterprise to incur many disruptions until all individual systems are corrected for the common root cause (if ever). The total of individual repairs may be far more costly and require more time than applying systemic repair to entire enterprise. Moreover, large enterprises may have many system disruption causes concurrently occurring, thus increasing the number and frequency of disruptions.

Additionally, an outage in one system may cause false 'triggers' in another system, which may lead to unnecessary, no-value repairs, and delays in finding a true solution. Furthermore, recurring systemic outages may be determined to be random to any system, and thus, never repaired. However, as the systemic error is not repaired, the enterprise continues to suffer the multiple, repeated outages.

In further conventional approaches, an attempt may be made to manually determine the root causes for an individual system disruption. That is, rather than simply fixing the individual system disruption, an attempt is made to determine the root cause of the disruption for that system. However, with this approach, a long time and extensive manual effort may be required to determine the individual root cause, and an enterprise-wide root cause for the disruption is not determined. That is, the determination of root cause is constrained to a determination of root cause within that particular system.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive disruption data for an enterprise and determine optimal selected disruption data from the received disruption data. Additionally, the programming instructions are operable to correlate triggering events of the optimal selected disruption data to one or more systemic root cause categories and identify a systemic root cause based on the triggering events of the optimal selected disruption data. Furthermore, the programming instructions are operable to determine an optimal enterprise solution set based on the identified systemic root cause and determine an optimal enterprise transformation set based on the optimal enterprise solution set. Moreover, the programming instructions are operable to output the optimal enterprise transformation set for implementing the optimal enterprise transformation set in the enterprise.

In another aspect of the invention, a system comprises a scale &juxtaposition (S-J) filter operable to receive disruption data for an enterprise and determine optimal selected disruption data from the received disruption data and a triggering events correlator (TEC) operable to correlate triggering events of the optimal selected disruption data to one or more systemic root cause categories. Additionally, the system comprises a systemic root cause spectrum analyzer (SRCSA) operable to identify a systemic root cause for the triggering events of the optimal selected disruption data and a systemic solutions selector (SSS) operable to determine an optimal enterprise solution set based on the identified systemic root cause. Furthermore, the system comprises a transformer operable to determine an optimal enterprise transformation set based on the optimal enterprise solution set and output the optimal enterprise transformation set for an implementation of the optimal enterprise transformation set in the enterprise.

In an additional aspect of the invention, a computer program product comprising a computer usable storage medium having readable program code embodied in the medium is provided. The computer program product includes at least one component operable to receive disruption data for an enterprise and determine optimal selected disruption data from the received disruption data. Additionally, the at least one component is operable to correlate triggering events of the optimal selected disruption data to one or more systemic root cause categories and identify a systemic root cause based on the triggering events of the optimal selected disruption data. Furthermore, the at least one component is operable to determine an optimal enterprise solution set based on the identified systemic root cause and determine an optimal enterprise transformation set based on the optimal enterprise solution set. Moreover, the at least one component is operable to output the optimal enterprise transformation set for implementing the optimal enterprise transformation set in the enterprise.

In a further aspect of the invention, a method comprises providing a computer infrastructure operable to receive disruption data for an enterprise and determine optimal selected disruption data from the received disruption data. Additionally, the computer infrastructure is operable to correlate triggering events of the optimal selected disruption data to one or more systemic root cause categories and identify a systemic root cause based on the triggering events of the optimal selected disruption data. Furthermore, the computer infrastructure is operable to determine an optimal enterprise solution set based on the identified systemic root cause; and determine an optimal enterprise transformation set based on the optimal enterprise solution set. Also, the computer infrastructure is operable to output the optimal enterprise transformation set for implementing the optimal enterprise transformation set in the enterprise and determine estimated disruptions based on an implementation of the optimal enterprise transformation set in the enterprise. Additionally, the computer infrastructure is operable to compare the estimated disruptions with actual disruptions detected upon the implementation of the optimal enterprise transformation set in the enterprise. When the comparing the estimated disruptions with the actual disruptions indicates the estimated disruptions do not approximate the actual disruptions, the method further comprising adjusting at least one of the optimal selected disruption data and the optimal enterprise solution set.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
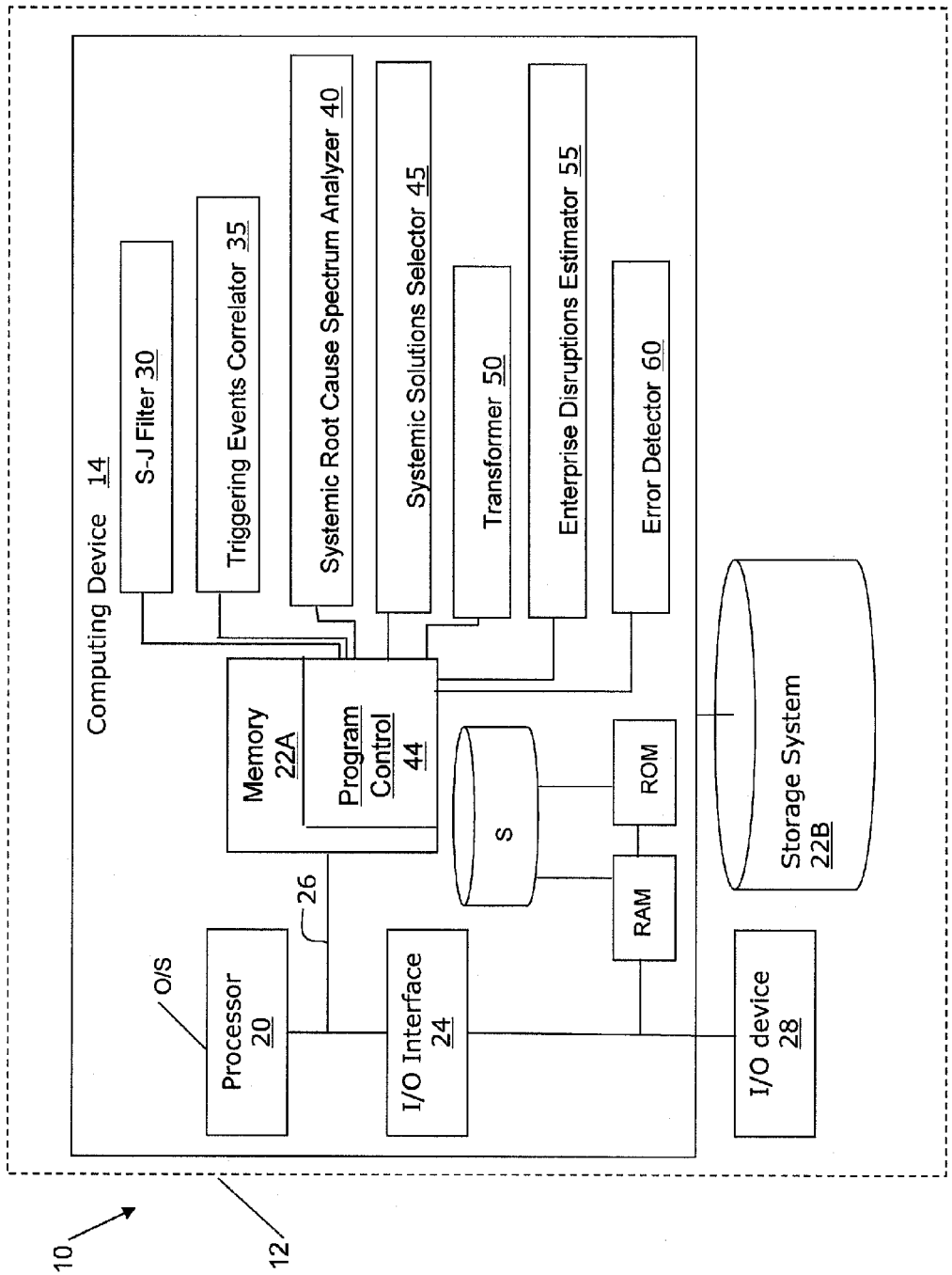
FIG. 1 shows an illustrative environment for implementing the steps in accordance with the invention.

The present invention generally relates to eliminating disruptions in enterprises, and more particularly, to an optimal, adaptive method and system to eliminate disruptions in enterprises. More specifically, the present invention is operable to identify a non-overlapping, unique systemic root cause based on apparently non-related disruption triggering events.

Implementing the present invention automatically adapts the enterprise to continue to correct the highest impacting systemic root causes, thus, for example, eliminating outages rapidly. Often the cause of individual system disruptions are common across many systems. By implementing the present invention, the optimal set of systemic root causes to eliminate may be determined. Additionally, implementing the present invention avoids sequential finding and/or re-occurring outages in other systems. Furthermore, by implementing the present invention, the optimal solution for each systemic root cause (one optimal solution for entire enterprise versus numerous individual repairs) may be determined. Thus, by implementing the present invention, waiting for numerous repeating outages across many systems to determine the enterprise-wide systemic root cause can be avoided.

In embodiments, the systemic solution may be applied to a whole enterprise and not just those systems that have had outages, which may be thought of as an "inoculation." A cost benefit may be realized by applying a repair in advance across an enterprise rather than sequentially by individual system. Furthermore, by implementing the present invention, broader transformations for the enterprises may be determined to avoid new types of triggering events in the future.

By implementing the present invention, a same "systemic" root cause, that may be in multiple systems in the enterprise may be detected and corrected. That is, conventionally, the "systemic" root cause may only be found sequentially over a very long time with many reoccurrences (dependent on number of systems with the same problem, interactions of disruptions across systems, etc.). However, implementing the present invention allows for determination of a systemic root cause for errors in an enterprise and a correction of the systemic root cause.

More specifically, conventionally, upon determining a disruption in an individual system of the enterprise, a repair is made to correct the individual system. However, this repair may not be the optimal solution for the entire enterprise. For example, the repair made to correct the individual system may have corrected the individual system to the detriment of the overall enterprise, or may have corrected the individual system without solving the bigger problem of the enterprise.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following:

- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, and/or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1).

The computing device 14 includes a scale and juxtaposition (S-J) filter 30, a triggering events correlator (TEC) 35, a systemic root cause spectrum analyzer (SRCSA) 40, a systemic solutions selector (SSS) 45, a transformer 50, an enterprise disruptions estimator (EDE) 55 and an error detector 60. The S-J filter 30 is operable to receive an indication of the disruptions of an enterprise and filter the disruptions to determine a set of optimal selected disruptions. The TEC 35 is operable to correlate the triggering events to root causes. The SRCSA 40 is operable to provide a systemic root cause spectrum and identify a systemic root cause for the disruption. The SSS 45 is operable to determine an optimal enterprise solution set. The transformer 50 is operable to determine instructions for implementing the optimal enterprise solution set. The EDE 55 and the error detector 60 are operable to estimate an expected number of disruptions in light of the implemented optimal enterprise solution set, compare the expected number of disruptions with an actual number of disruptions, and update the S-J filter 30 and/or the SSS 45, as may be necessary, in view of the comparison, e.g., the processes described herein. The S-J filter 30, the TEC 35, the SRCSA 40, the systemic solutions selector 45, the transformer 50, the enterprise disruptions estimator 55 and the error detector 60 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 (having program code) controls the S-J filter 30, the TEC 35, the SRCSA 40, the SSS 45, the transformer 50, the EDE 55 and the error detector 60. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

In embodiments, the invention provides a business method that performs the steps of the invention on a subscription, advertising, and/or fee basis. That is, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Flow Diagrams

FIGS. 2-4 and 10 show exemplary flows for performing aspects of the present invention. The steps of FIGS. 2-4 and 10 may be implemented in the environment of FIG. 1, for example. The flow diagrams may equally represent a high-level block diagrams of the invention. The flowcharts and/or block diagram in FIGS. 2-4 and 10 illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved. Each block of each flowchart, and combinations of the flowchart illustrations can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

System Repair Determination

Figure 2:
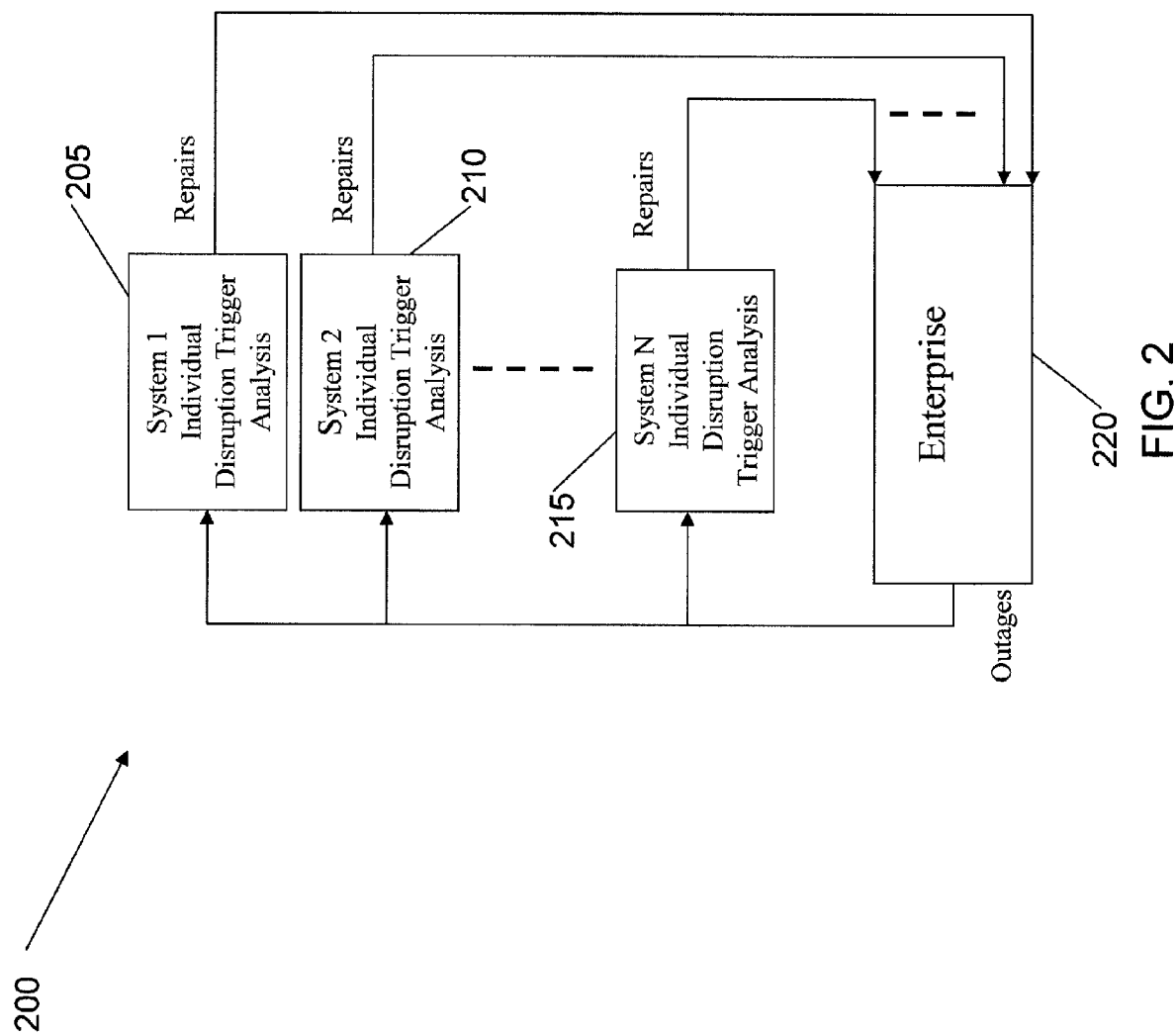
FIG. 2 shows an exemplary flow for determining a system repair.

FIG. 2 shows a flow 200 for a conventional system repair determination. More specifically, FIG. 2 shows, an enterprise 220 which includes a number of systems (not shown). Upon occurrence of a disruption, e.g., an outage, an individual disruption trigger analysis may be performed (e.g., at 205, 210 and/or 215) for an affected system of the enterprise 220. Thus, as shown in FIG. 2, upon an indication of a disruption in a particular system of the enterprise, e.g., an outage in the system, an individual disruption trigger analysis may be performed for that system. The individual trigger analysis may determine individual repairs necessary to fix the disruption for the particular system and these repairs for the particular system may be implemented to fix the disruption.

However, as discussed above, the system repair determination of FIG. 2 does not address any individual root causes for the system disruption and does not address any underlying enterprise-wide systemic root causes for the individual outages detected in one or more of the systems. Thus, a disruption due to an error in one system may be repaired. However, that same error may cause a further disruption in a different system, which would necessitate a further repair for that system.

System Root Cause Determination

Figure 3:
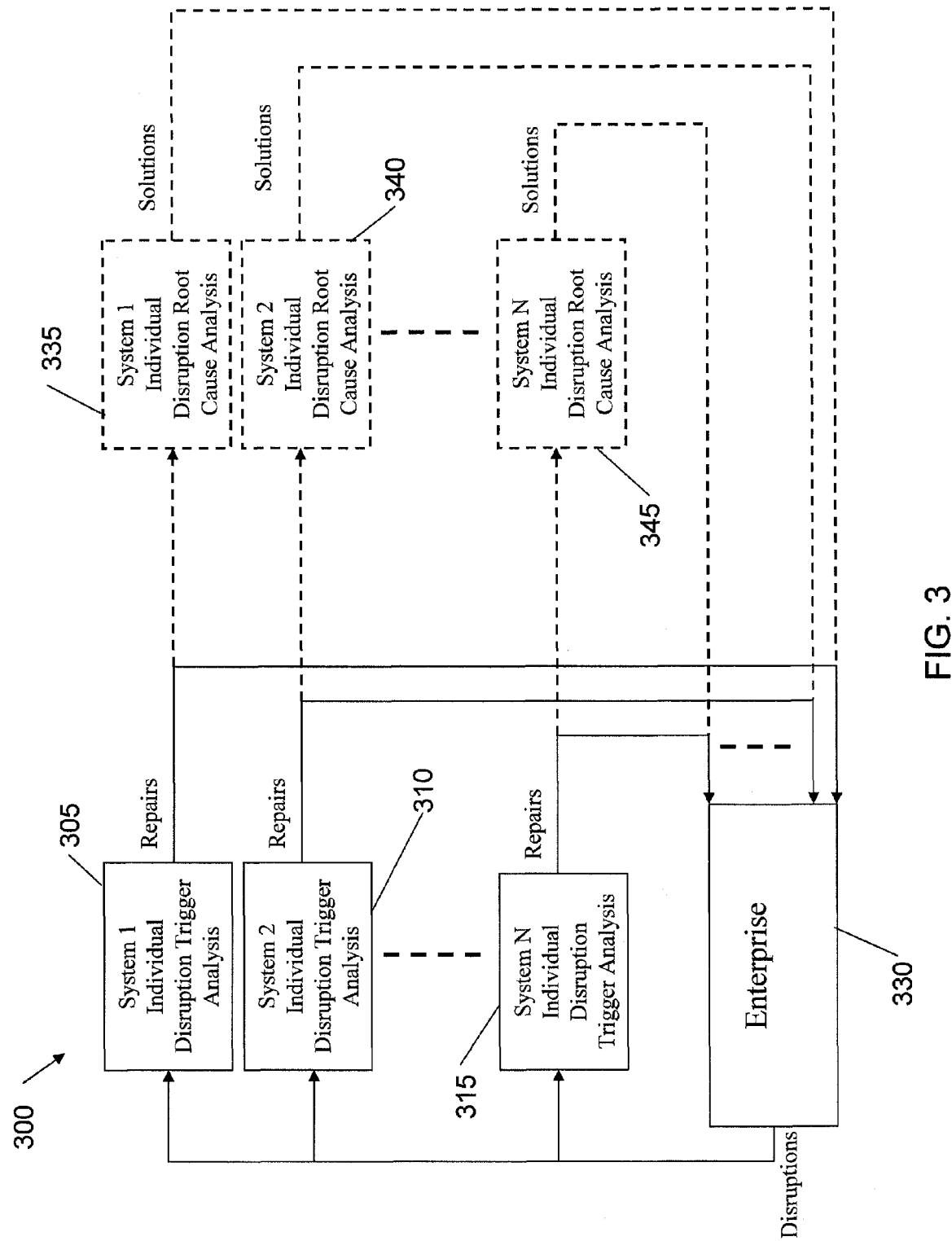
FIG. 3 shows an exemplary flow for manually determining a root cause for a disruption of an individual system and a solution for the individual system.

FIG. 3. shows a flow 300 for a conventional system root cause determination. More specifically, FIG. 3 shows an enterprise 330 which includes a number of systems (not shown). Upon occurrence of an outage, an individual disruption trigger analysis may be performed (e.g., at 305, 310 and/or 315) for an affected system of the enterprise 330. Moreover, an individual disruption root cause analysis may be manually performed (e.g., at 335, 340 and or 345) for the affected system. Thus, as shown in FIG. 3, upon an indication of a disruption in a particular system of the enterprise, e.g., an outage in the system, an individual disruption trigger analysis may be performed for that system. The individual trigger analysis may determine individual repairs necessary to fix the disruption for the particular system and these repairs for the particular system may be implemented to fix the disruption. Moreover, as shown in FIG. 3, the individual root cause analysis may determine a root cause for the disruption within the particular system and may determine a solution (e.g., at 335, 340 and or 345).

However, with the approach of FIG. 3, a determined root cause may require extensive manual effort and time, but is only for a particular system and a determined solution is only for the particular system. Thus, as discussed above, the approach of FIG. 3 does not address any underlying enterprise-wide systemic root causes for the individual outages detected in one or more of the systems. Thus, a disruption due to an error in one system may be repaired and a solution generated to address the root cause for the disruption within a particular system. However, that same disruption may occur in a second system. Moreover, the solution determined for the particular system may not apply to the second system. Rather, with the approach of FIG. 3, a separate root cause and solution determination would be performed for a disruption on the second system.

Enterprise Root Cause Determination

Figure 4:
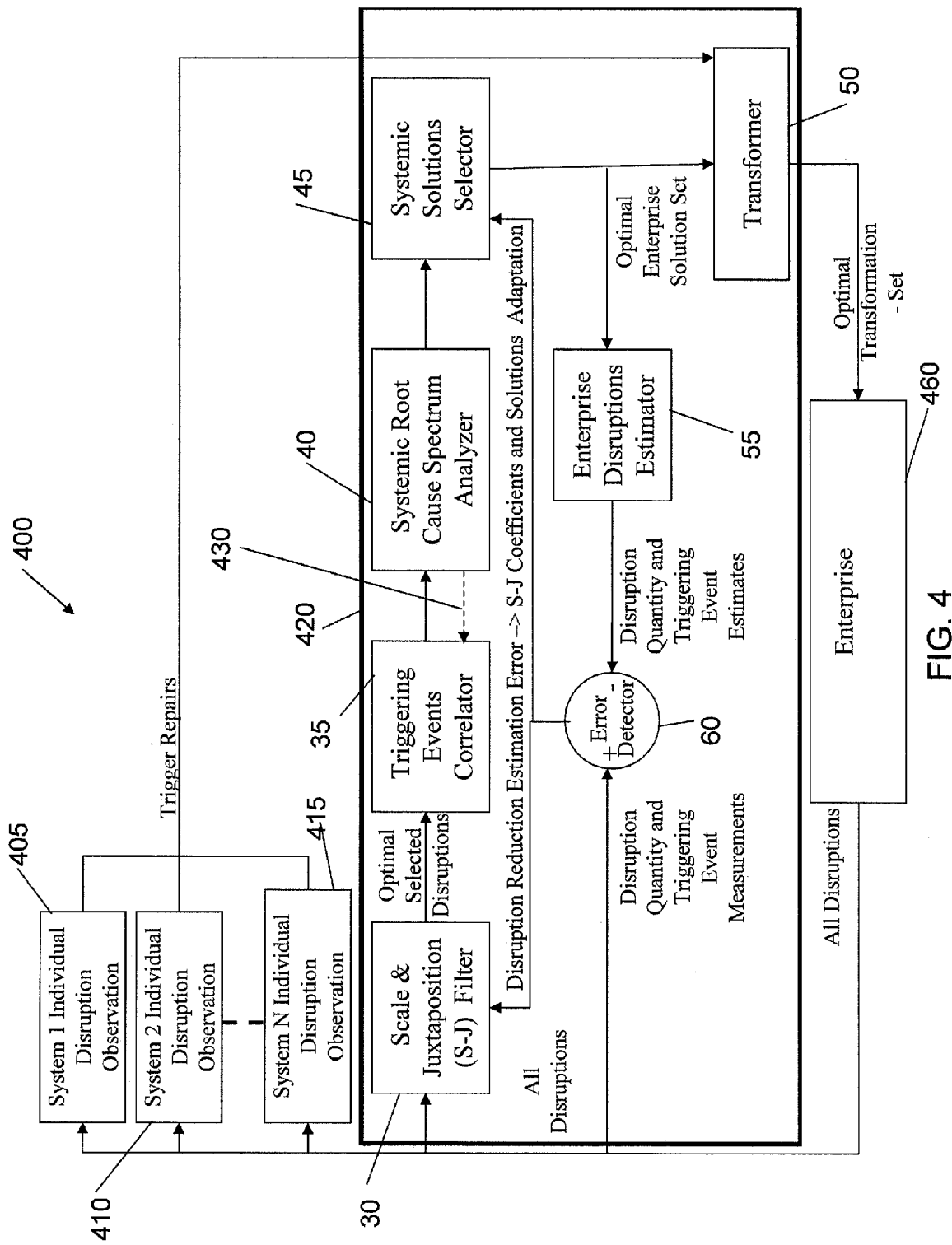
FIG. 4 shows an exemplary flow for determining an enterprise-wide root cause for a disruption and a solution for the enterprise to address the disruption due to the determined enterprise-wide root cause in accordance with aspects of the invention.

FIG. 4 shows an exemplary flow 400 for an enterprise-wide systemic root cause determination in accordance with aspects of the present invention. As shown in FIG. 4, all the disruptions in an enterprise 460 are sent to an enterprise root cause determination and solution tool 420. In embodiments, the enterprise root cause determination and solution tool 420 includes the scale and juxtaposition (S-J) filter 30, the triggering events correlator (TEC) 35, the systemic root cause spectrum analyzer (SRCSA) 40, the systemic solutions selector (SSS) 45, the transformer 50, the enterprise disruptions estimator (EDE) 55 and the error detector 60. Additionally, as shown in FIG. 4, the enterprise sends the disruptions to individual disruption observations for each system, such that, e.g., a technician may generate a report describing the disruption and any action taken, as described further below.

Scale and Juxtaposition (S-J) Filter

In accordance with aspects of the invention, the S-J filter 30 is operable to determine the optimal sample of disruptions from amongst all the disruptions in an enterprise that will be used to determine the enterprise-wide systemic root cause. An enterprise may not have infinite financial resources or time resources to invest in determining a systemic root cause for an enterprise disruption. By utilizing the S-J filter 30, a need to analyze all disruptions may be avoided, thus expending less financial and/or time resources. Moreover, by utilizing the S-J filter 30, waiting for numerous repeating disruptions across many systems in order to determine the systemic root cause may be avoided.

As shown in FIG. 4, in embodiments, the S-J filter 30 receives an indication of all disruptions, e.g., outages, errors, etc., and outputs optimal selected disruptions. That is, the S-J filter 30 filters all of the disruptions to only those disruptions within a defined area (e.g., particular systems) of the enterprise over a configurable period of time (D). The period of time can include disruption data from the past and current disruption data. According to aspects of the invention, the S-J filter 30 may apply scale coefficients and architectural juxtaposition coefficients to the received data to determine an optimal sample of systems and outages for further processing. The S-J filter 30 allows for efficiency by selecting the smallest set of disruptions to be analyzed, yet produces an accurate representation of an enterprise-wide systemic root causes impacting the entire enterprise.

More specifically, in embodiments, the S-J filter 30 may determine the optimal selected set of disruptions by determining where within the enterprise disruptions are measured, and/or the scale or size of the review. For example, an enterprise may have, e.g., six hundred systems. However, for example, the S-J filter 30 may be configured to select as optimal selected disruptions, those disruptions occurring in, for example, only twenty systems of the six hundred systems in, e.g., a particular order. Additionally, as described further below, the S-J filter 30 is operable to feed in relations of enterprise architecture and using the relations for defining what the S-J filter 30 measures.

Additionally, the S-J filter 30 may be configured to select as optimal selected disruptions, those enterprise disruptions occurring during a defined period of time. For example, the S-J filter 30 may be configured to select as optimal selected disruptions, those enterprise disruptions occurring in the twenty systems during a period of, e.g., six months or two weeks.

Thus, the S-J filter 30 can be thought of as operable to define a sample size (e.g., the optimal selected disruptions) for the determination of an enterprise-wide systemic root cause, described further below. In other words, in embodiments, the S-J filter 30 may be configured to perform a coarse review of the enterprise or a fine review of the enterprise.

Figure 5:
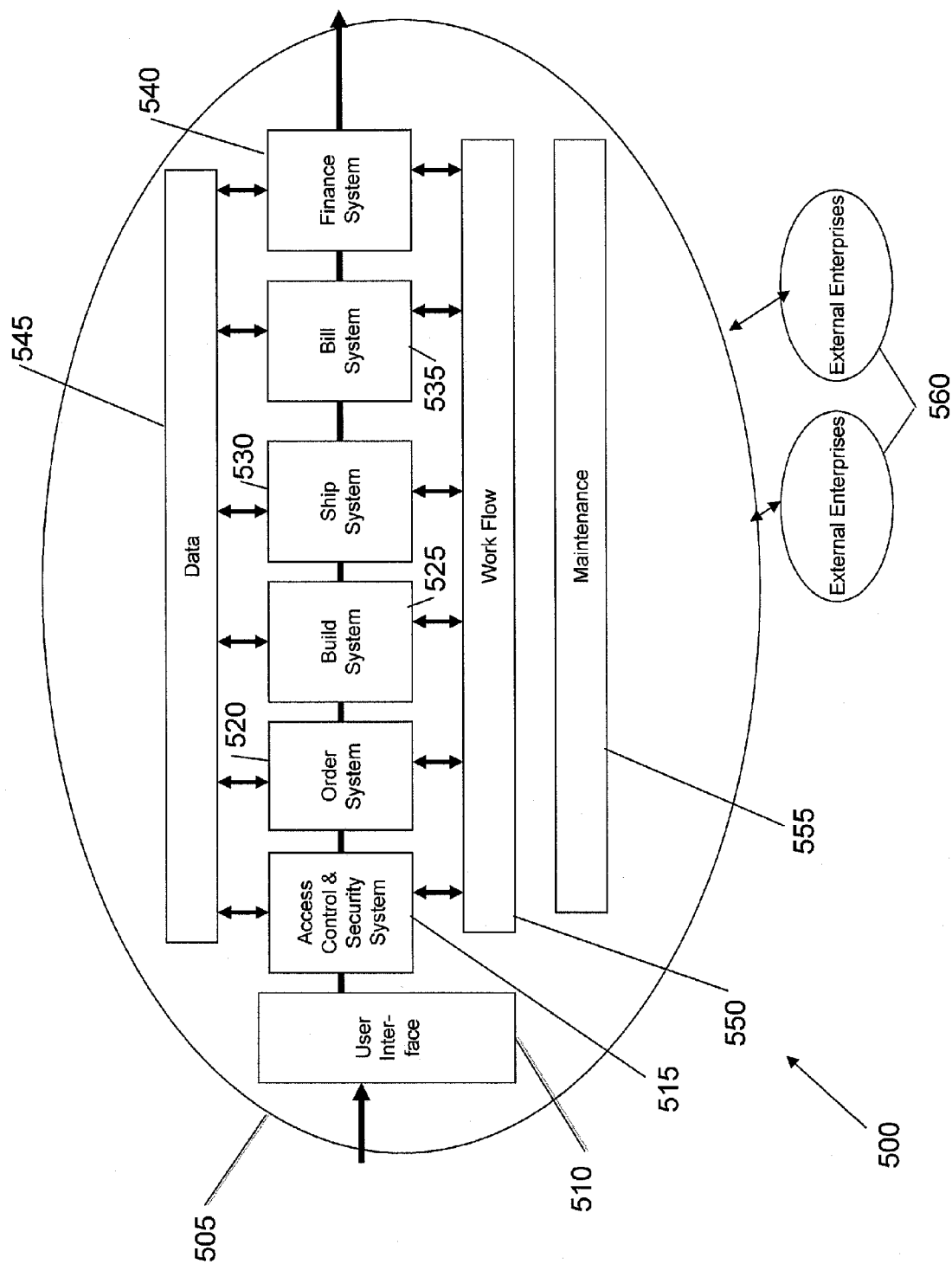
FIG. 5 shows an exemplary information technology (IT) enterprise functional view in accordance with aspects of the invention.

FIG. 5 shows an exemplary information technology (IT) enterprise functional view 500 in accordance with aspects of the invention. One of ordinary skill in the art would understand the elements of the exemplary IT enterprise, such that further description is not necessary for an understanding of the present invention. For example, as shown in FIG. 5, the exemplary IT enterprise 505 may comprise a number of systems, including, for example, a user interface 510, an access control and security system 515, an order system 520, a build system 525, a ship system 530, a bill system 535 and a finance system 540, along with a database 545, a work flow system 550 and a maintenance system 555. Additionally, as shown in FIG. 5, the exemplary IT enterprise may communicate with a number of external enterprises 560. As should be understood by those ordinarily skilled in the art, an outage may occur in any of the systems of the exemplary IT enterprise 505. Moreover, an outage that occurs in multiple systems often may be due to a same root cause.

Figure 6:
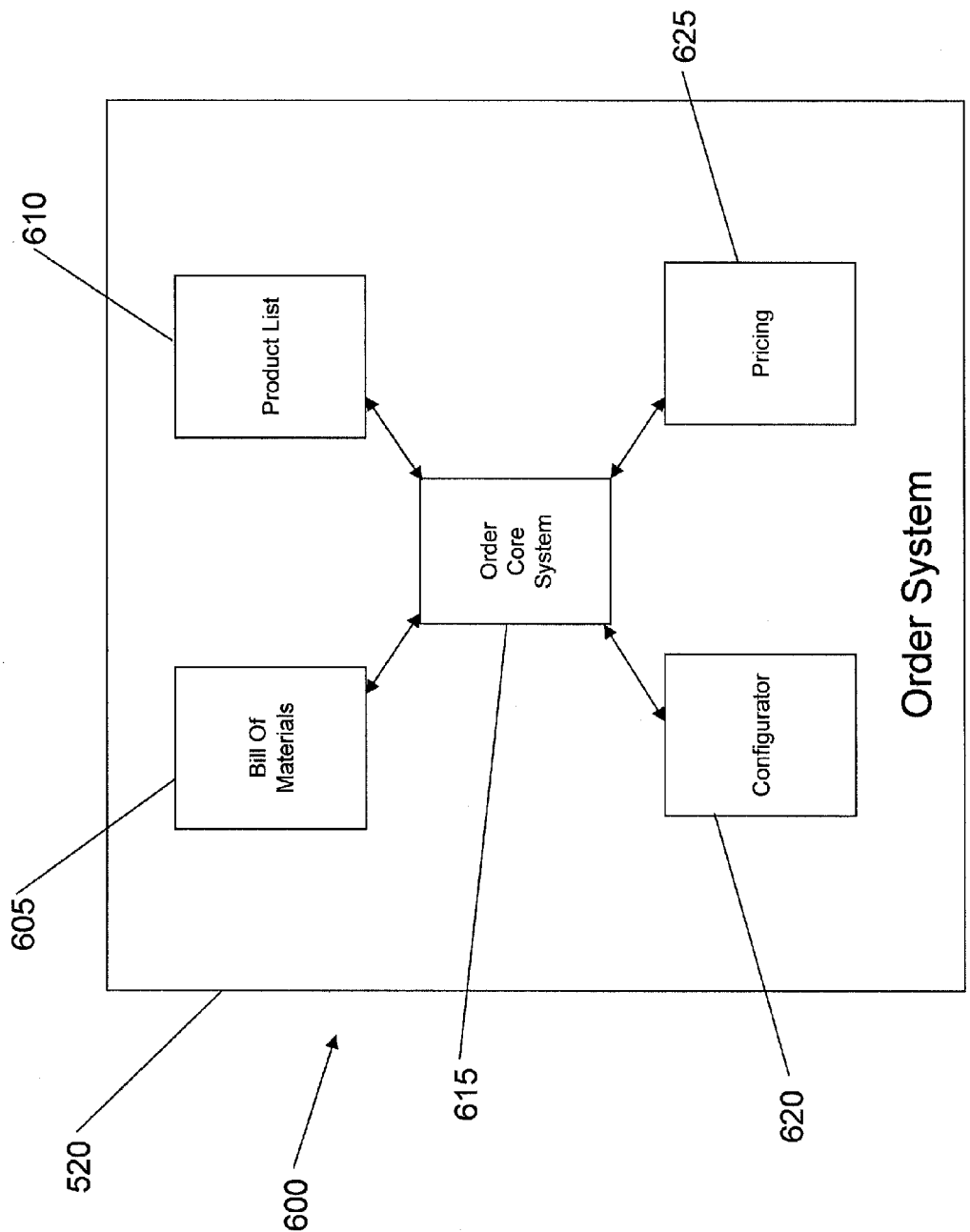
FIG. 6 shows an exemplary information technology order family functional view in accordance with aspects of the present invention.

FIG. 6 shows an exemplary IT order system family functional view 600 in accordance with aspects of the invention, which is a more detailed view of the order system 520 shown in FIG. 5. As shown in FIG. 6, the exemplary family of the order system 520 includes an order core system 615 and the other applications necessary for the entire order function to operate, e.g., the bill of materials application 605, the product list application 610, the configurator application 620 and the pricing application 625. As explained further below, in accordance with aspects of the present invention, the S-J filter 30 may be configured to, for example, return outages narrowly, e.g., within the order core system 615, or more broadly, e.g., within the family of the order system 520.

Figure 7:
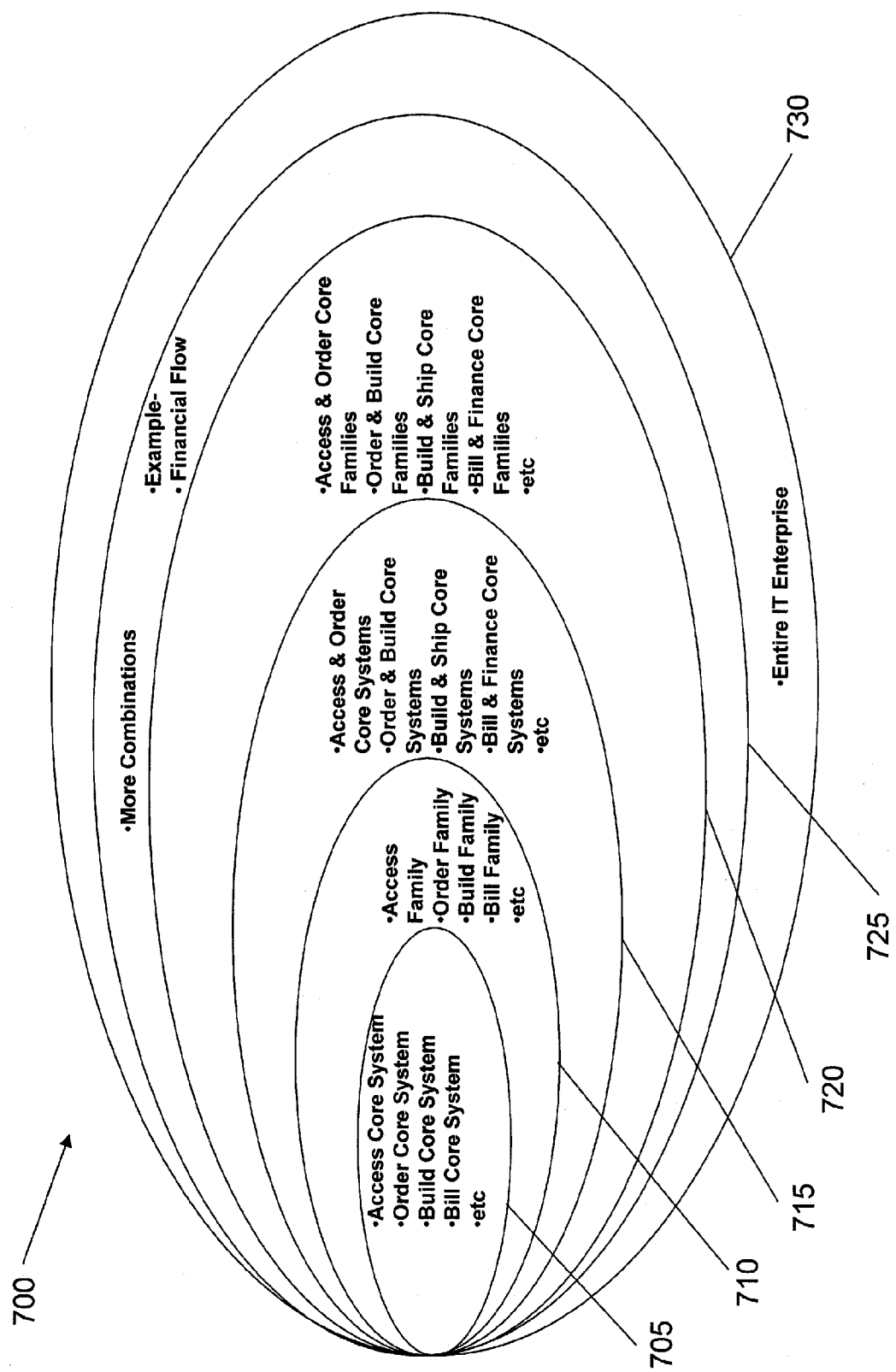
FIG. 7 shows an exemplary IT scale and juxtaposition view in accordance with aspects of the present invention.

FIG. 7 shows an exemplary IT scale and juxtaposition view 700 in accordance with aspects of the invention. The exemplary IT scale and juxtaposition view 700 may be determined from the architecture of a given IT enterprise.

As described above, the S-J filter 30 may be set more broadly, to, e.g., return disruptions over an entire IT system, or more narrowly, to, e.g., return disruptions for a particular core system. More specifically, the S-J filter 30 is operable to select individual or combinations of core systems or system families up to the entire enterprise based on "scale" desired and how systems are architecturally related (juxtaposition). With a setting of the S-J filter 30 set "wider" (e.g., more core systems and families), more general and encompassing solutions may be determined, as described further below. In contrast, with a setting of the S-J filter 30 set "narrower", a more specific solution may be determined, as described further below.

As shown in FIG. 7, the exemplary IT scale and juxtaposition view 700 includes ovals of increasingly broadening scope, which graphically depict exemplary settings for the S-J filter 30. For example, oval 705 corresponds to the narrowest setting for the S-J filter 30, which would encompass those disruptions within a core system, e.g., an access core system, an order core system, a build core system, or a bill core system, amongst other core systems. Oval 710 corresponds to a broader setting of the S-J filter 30, which would encompass those disruptions within an entire family, e.g., an access family, an order family, a build family, or a bill family, amongst other families. Oval 715 corresponds to a broader setting of the S-J filter 30, which would encompass those disruptions within two core systems, e.g., the access core system and order core system, the order core system and build core system, the build core system and ship core system, and/or the bill core system and finance core system, amongst other pairs of core systems. Oval 720 corresponds to a broader setting of the S-J filter 30, which would encompass those disruptions within two families, e.g., the access and order families, the order and build families, the build and ship families, and the bill and finance families, amongst other pairs of families. Oval 725 corresponds to a broader setting of the S-J filter 30, which would encompass, for example, more combinations of core systems or families. For example, oval 725 may correspond to a financial flow within the IT enterprise. Lastly, oval 730 corresponds to the broadest setting of the S-J filter 30, which would encompass the entire IT enterprise. While particular settings of the S-J filter 30 are graphically depicted in FIG. 7, it should be understood by one ordinarily skilled in the art that these settings are exemplary, and the invention contemplates that other settings for the S-J filter 30 may be used with the present invention.

In embodiments, the S-J filter 30 is operable to select individual or combinations of core systems or system families up to the entire enterprise based on a number desired and how systems are architecturally related. The "wider" the filter (e.g., more core systems and families), the more general and encompassing the solutions. For example, a wider S-J filter setting may determine a primary enterprise-wide systemic root cause is a need to update ten third party software products. In contrast, the "narrower" the S-J filter 30, the more specific the resulting solution. For example, the present invention may determine a primary enterprise-wide systemic root cause is the need to update one third party software product.

In embodiments, the "narrower" or "wider" S-J filter 30 setting may be based on solution parameters such as: time to implement; cost; knowledge of problem area(s); and priorities, amongst other parameters. In accordance with the present invention, as explained further below, after an initial "setting", the S-J filter 30 may automatically "widen" and "narrow" until the expected incidents of disruptions approximates or equals the acceptable number of disruptions. Additionally, as explained further below, the automatic widening and/or narrowing of the S-J filter 30 provides for adaptation and/or optimization.

It should be understood that, in embodiments, the invention contemplates that the S-J filter 30 may be turned off or not used. That is, while the S-J filter 30 may provide for a more efficient determination of an enterprise-wide systemic root cause by filtering the disruptions, for example, through a narrowing of where and/or when disruptions are occurring, the present invention is operable to determine an enterprise-wide systemic root cause without using the S-J filter 30.

Triggering Events Correlator

Referring back to FIG. 4, the optimal selected disruptions are sent from the S-J filter 30 to the triggering events correlator 35. As should be understood by those skilled in the art, each disruption has an observable, physical triggering event. Moreover, upon the occurrence of a triggering event, a report or written record may be generated, e.g., manually, indicating the observable, physical triggering event and possibly indicating what recovery action was taken. Additionally, as should be understood by those skilled in the art, the physical triggering event usually is not the actual root cause of the disruption.

In accordance with aspects of the invention, the triggering events correlator (TEC) 35 applies a series of queries to the triggering event physical observations (noted in the report or written record) in the analysis sample of the optimal selected disruptions. For example, the TEC 35 queries the disruption data (e.g., in the report or written record) of the optimal selected disruptions for keywords indicating a triggering event. That is, upon an occurrence of a disruption, an outage problem description is created, which describes the disruption using one or more keywords. The outage problem description may be created manually or may be automated. Some exemplary keywords include "change," "increased usage," "new design," "network outage event," and "capacity," amongst other keywords. For example, an outage problem description may state, "two-hundred percent increased usage for website triggered outage." Thus, the TEC 35 would detect the keywords "increased usage" and associate these keywords with a systemic root cause for this particular outage.

TABLE 1 sets forth a list of exemplary keywords and their related systemic root causes. As should be understood, the list of exemplary keywords and their related systemic root causes shown in TABLE 1 is an exemplary and non-exhaustive list, and the invention contemplates other keywords and related systemic root causes.

TABLE 1

| Key Word | Systemic Root Cause |
| --- | --- |
| Change | Change Management |
| Communicate | Change Management |
| Enhancement | Change Management |
| Feature | Change Management |
| Modification | Change Management |
| New | Change Management |
| Update | Change Management |
| Architecture | Design |
| Bug | Design |
| Code | Design |
| Configuration | Design |
| Data | Design |
| Decompose | Design |
| Defect | Design |
| Downstream | Design |
| Error | Design |
| Flow | Design |
| Functional | Design |
| Gap | Design |
| Incomplete | Design |
| Incorrect | Design |
| Interface | Design |
| Known | Design |
| Latent | Design |
| Memory | Design |
| Missed | Design |
| Requirement | Design |
| Review | Design |
| Table | Design |
| Time | Design |
| Upstream | Design |
| Vague | Design |
| Cable | External |
| Cut | External |
| HVAC | External |
| Power | External |
| Weather | External |
| Alarm | Fault Management |
| Classify | Fault Management |
| Critical | Fault Management |
| Delay | Fault Management |
| Detect | Fault Management |
| Fault | Fault Management |
| Incorrect | Fault Management |
| Monitoring | Fault Management |
| Priority | Fault Management |
| Slow | Fault Management |
| Board | Hardware and User Maintenance |
| Connector | Hardware and User Maintenance |
| CPU | Hardware and User Maintenance |
| Inadequate | Hardware and User Maintenance |
| Maintenance | Hardware and User Maintenance |
| Module | Hardware and User Maintenance |
| Monitoring | Hardware and User Maintenance |
| PCB | Hardware and User Maintenance |
| Remedial | Hardware and User Maintenance |
| Preventative | Hardware and User Maintenance |
| Scheduled | Hardware and User Maintenance |
| Supply | Hardware and User Maintenance |
| Back | Infrastructure Currency |
| Commercial | Infrastructure Currency |
| Data | Infrastructure Currency |
| Defect | Infrastructure Currency |
| End | Infrastructure Currency |
| Known | Infrastructure Currency |
| Known | Infrastructure Currency |
| Latent | Infrastructure Currency |
| Level | Infrastructure Currency |
| Life | Infrastructure Currency |
| LINUX | Infrastructure Currency |
| Middleware | Infrastructure Currency |
| Operating | Infrastructure Currency |

TABLE 1-continued

| Key Word | Systemic Root Cause |
|---|---|
| OS | Infrastructure Currency |
| Party | Infrastructure Currency |
| Release | Infrastructure Currency |
| Third | Infrastructure Currency |
| UNIX | Infrastructure Currency |
| Unsupported | Infrastructure Currency |
| Upgrade | Infrastructure Currency |
| Vendor | Infrastructure Currency |
| High | Performance Management & Capacity Planning |
| Increase | Performance Management & Capacity Planning |
| Insufficient | Performance Management & Capacity Planning |
| Large | Performance Management & Capacity Planning |
| Load | Performance Management & Capacity Planning |
| Overload | Performance Management & Capacity Planning |
| Response | Performance Management & Capacity Planning |
| Slow | Performance Management & Capacity Planning |
| Unexpected | Performance Management & Capacity Planning |
| Unplanned | Performance Management & Capacity Planning |
| Volume | Performance Management & Capacity Planning |
| Access | Procedural |
| Entry | Procedural |
| Followed | Procedural |
| Implement | Procedural |
| Incomplete | Procedural |
| Incorrect | Procedural |
| Input | Procedural |
| Manual | Procedural |
| Performed | Procedural |
| Prevent | Procedural |
| Procedural | Procedural |
| Training | Procedural |
| Untrained | Procedural |
| User | Procedural |
| Valid | Procedural |
| Alarm | Recovery Management |
| Critical | Recovery Management |
| Delay | Recovery Management |
| Incorrect | Recovery Management |
| Priority | Recovery Management |
| Recovery | Recovery Management |
| Slow | Recovery Management |
| Communication | Resource Availability |
| Disk | Resource Availability |
| Insufficient | Resource Availability |
| Limit | Resource Availability |
| Lost | Resource Availability |
| Memory | Resource Availability |
| Monitoring | Resource Availability |
| Network | Resource Availability |
| Resource | Resource Availability |
| Case | Test |
| Data | Test |
| Environment | Test |
| Escape | Test |
| Facilities | Test |
| Gap | Test |
| Insufficient | Test |
| Script | Test |
| Test | Test |
| Time | Test |

In response to an outage, for example, a technician may file a report indicating a problem observation statement of: "Preventative action not performed in response to important alarm due to extensive, less critical alarms." Additionally, the technician may indicate a recovery action taken in the report stating, for example, "Implement procedural changes to prevent future occurrences."

In accordance with aspects of the invention, the TEC 35 may determine a total number of those keywords in both the problem observation and the recovery action taken recorded in the report. TABLE 2, shown below, displays an example of the list of exemplary keywords and their related systemic root causes along with a number of hits of those keywords in the problem observation statement, the recovery action taken statement and the total hits for all the keywords associated with each of the systemic root causes. More specifically, the observation count column indicates the number of instances of the keyword in the problem observation, and the recovery count column indicates the number of instances of the keyword in the statement of the recovery action taken. Moreover, the systemic count is a sum of all observation counts and recovery counts for each particular systemic root cause.

TABLE 2

| Key Word | Systemic Root Cause | Observation Count | Recovery Count | Systemic Count |
|---|---|---|---|---|
| Change | Change Management | 0 | 0 | 0 |
| Communicate | Change Management | 0 | 0 | |
| Enhancement | Change Management | 0 | 0 | |
| Feature | Change Management | 0 | 0 | |
| Modification | Change Management | 0 | 0 | |
| New | Change Management | 0 | 0 | |
| Update | Change Management | 0 | 0 | |
| Architecture | Design | 0 | 0 | 0 |
| Bug | Design | 0 | 0 | |
| Code | Design | 0 | 0 | |
| Configuration | Design | 0 | 0 | |
| Data | Design | 0 | 0 | |
| Decompose | Design | 0 | 0 | |
| Defect | Design | 0 | 0 | |
| Downstream | Design | 0 | 0 | |
| Error | Design | 0 | 0 | |
| Flow | Design | 0 | 0 | |
| Functional | Design | 0 | 0 | |
| Gap | Design | 0 | 0 | |
| Incomplete | Design | 0 | 0 | |
| Incorrect | Design | 0 | 0 | |
| Interface | Design | 0 | 0 | |
| Known | Design | 0 | 0 | |
| Latent | Design | 0 | 0 | |
| Memory | Design | 0 | 0 | |
| Missed | Design | 0 | 0 | |

TABLE 2-continued

| Key Word | Systemic Root Cause | Observation Count | Recovery Count | Systemic Count |
|---|---|---|---|---|
| Requirement | Design | 0 | 0 | |
| Review | Design | 0 | 0 | |
| Table | Design | 0 | 0 | |
| Time | Design | 0 | 0 | |
| Upstream | Design | 0 | 0 | |
| Vague | Design | 0 | 0 | |
| Cable | External | 0 | 0 | 0 |
| Cut | External | 0 | 0 | |
| HVAC | External | 0 | 0 | |
| Power | External | 0 | 0 | |
| Weather | External | 0 | 0 | |
| Alarm | Fault Management | 1 | 0 | 2 |
| Classify | Fault Management | 0 | 0 | |
| Critical | Fault Management | 1 | 0 | |
| Delay | Fault Management | 0 | 0 | |
| Detect | Fault Management | 0 | 0 | |
| Fault | Fault Management | 0 | 0 | |
| Incorrect | Fault Management | 0 | 0 | |
| Monitoring | Fault Management | 0 | 0 | |
| Priority | Fault Management | 0 | 0 | |
| Slow | Fault Management | 0 | 0 | |
| Board | Hardware and User Maintenance | 0 | 0 | 1 |
| Connector | Hardware and User Maintenance | 0 | 0 | |
| CPU | Hardware and User Maintenance | 0 | 0 | |
| Inadequate | Hardware and User Maintenance | 0 | 0 | |
| Maintenance | Hardware and User Maintenance | 0 | 0 | |
| Module | Hardware and User Maintenance | 0 | 0 | |
| Monitoring | Hardware and User Maintenance | 0 | 0 | |
| PCB | Hardware and User Maintenance | 0 | 0 | |
| Remedial | Hardware and User Maintenance | 0 | 0 | |
| Preventative | Hardware and User Maintenance | 1 | 0 | |
| Scheduled | Hardware and User Maintenance | 0 | 0 | |
| Supply | Hardware and User Maintenance | 0 | 0 | |
| Back | Infrastructure Currency | 0 | 0 | 0 |
| Commercial | Infrastructure Currency | 0 | 0 | |
| Data | Infrastructure Currency | 0 | 0 | |
| Defect | Infrastructure Currency | 0 | 0 | |
| End | Infrastructure Currency | 0 | 0 | |
| Known | Infrastructure Currency | 0 | 0 | |
| Known | Infrastructure Currency | 0 | 0 | |
| Latent | Infrastructure Currency | 0 | 0 | |
| Level | Infrastructure Currency | 0 | 0 | |
| Life | Infrastructure Currency | 0 | 0 | |
| LINUX | Infrastructure Currency | 0 | 0 | |
| Middleware | Infrastructure Currency | 0 | 0 | |
| Operating | Infrastructure Currency | 0 | 0 | |
| OS | Infrastructure Currency | 0 | 0 | |
| Party | Infrastructure Currency | 0 | 0 | |
| Release | Infrastructure Currency | 0 | 0 | |
| Third | Infrastructure Currency | 0 | 0 | |
| UNIX | Infrastructure Currency | 0 | 0 | |
| Unsupported | Infrastructure Currency | 0 | 0 | |
| Upgrade | Infrastructure Currency | 0 | 0 | |
| Vendor | Infrastructure Currency | 0 | 0 | |
| High | Performance Management & Capacity Planning | 0 | 0 | 1 |
| Increase | Performance Management & Capacity Planning | 0 | 0 | |
| Insufficient | Performance Management & Capacity Planning | 0 | 0 | |
| Large | Performance Management & Capacity Planning | 0 | 0 | |
| Load | Performance Management & Capacity Planning | 0 | 0 | |

TABLE 2-continued

| Key Word | Systemic Root Cause | Observation Count | Recovery Count | Systemic Count |
|---|---|---|---|---|
| Overload | Performance Management & Capacity Planning | 0 | 0 | |
| Response | Performance Management & Capacity Planning | 1 | 0 | |
| Slow | Performance Management & Capacity Planning | 0 | 0 | |
| Unexpected | Performance Management & Capacity Planning | 0 | 0 | |
| Unplanned | Performance Management & Capacity Planning | 0 | 0 | |
| Volume | Performance Management & Capacity Planning | 0 | 0 | |
| Access | Procedural | 0 | 0 | 4 |
| Entry | Procedural | 0 | 0 | |
| Followed | Procedural | 0 | 0 | |
| Implement | Procedural | 0 | 1 | |
| Incomplete | Procedural | 0 | 0 | |
| Incorrect | Procedural | 0 | 0 | |
| Input | Procedural | 0 | 0 | |
| Manual | Procedural | 0 | 0 | |
| Performed | Procedural | 1 | 0 | |
| Prevent | Procedural | 0 | 1 | |
| Procedural | Procedural | 0 | 1 | |
| Training | Procedural | 0 | 0 | |
| Untrained | Procedural | 0 | 0 | |
| User | Procedural | 0 | 0 | |
| Valid | Procedural | 0 | 0 | |
| Alarm | Recovery Management | 1 | 0 | 2 |
| Critical | Recovery Management | 1 | 0 | |
| Delay | Recovery Management | 0 | 0 | |
| Incorrect | Recovery Management | 0 | 0 | |
| Priority | Recovery Management | 0 | 0 | |
| Recovery | Recovery Management | 0 | 0 | |
| Slow | Recovery Management | 0 | 0 | |
| Communication | Resource Availability | 0 | 0 | 0 |
| Disk | Resource Availability | 0 | 0 | |
| Insufficient | Resource Availability | 0 | 0 | |
| Limit | Resource Availability | 0 | 0 | |
| Lost | Resource Availability | 0 | 0 | |
| Memory | Resource Availability | 0 | 0 | |
| Monitoring | Resource Availability | 0 | 0 | |
| Network | Resource Availability | 0 | 0 | |
| Resources | Resource Availability | 0 | 0 | |
| Case | Test | 0 | 0 | 0 |
| Data | Test | 0 | 0 | |
| Environment | Test | 0 | 0 | |
| Escape | Test | 0 | 0 | |
| Facilities | Test | 0 | 0 | |
| Gap | Test | 0 | 0 | |
| Insufficient | Test | 0 | 0 | |
| Script | Test | 0 | 0 | |
| Test | Test | 0 | 0 | |
| Time | Test | 0 | 0 | |

According to further aspects of the invention, the TEC 35 correlates the diverse triggering events across systems and disruptions into groups of common triggering event conditions. For example, the TEC 35 may determine a count of all the triggering events for each category of triggering event and determine triggering event groups. Additionally, in embodiments, the TEC 35 is operable to remove redundant triggering events (such as, for example, multiple reports of the same disruption for the same system) that offer no additional information, in order to avoid skewed disruption counts.

Thus, as shown above in TABLE 2, the TEC 35 has determined total counts of keyword hits for each category of systemic root cause. Thus, with the example of TABLE 2, the TEC 35 has determined two keyword hits in "fault management," one keyword hit in "hardware and user maintenance," one keyword hit in "performance management & capacity planning," four keyword hits in "procedural" and two keyword hits in "recovery management."

As can be observed, with this example, the "procedural" systemic root cause has the most keyword hits. Thus, in accordance with aspects of the invention, as described further below, with this example, a "procedural" problem will be identified as the probable enterprise-wide systemic root cause of the disruption.

While the above example has a smaller sample of keywords, it should be understood that the invention contemplates that the TEC 35 may correlate hundreds or thousands of keywords with their respective enterprise-wide systemic root cause. For example, with a larger system, the number of keyword hits may average out more quickly and those keywords having a small number of hits (e.g., noise) may quickly become statistically insignificant. Additionally, in embodiments, if the reports do not contain sufficient information to determine a systemic root cause, then the TEC 35 is operable to indicate a problem with the reports.

TABLE 3 shows a further example of the list of exemplary keywords and their related systemic root causes along with a number of hits of those keywords recorded in a second exemplary problem observation. With this example, a user, e.g., a technician, has indicated in the report, "An unexpected high volume of data coming from Workflow System to Inventory System and subsequently to Disk Management System consumed system resources and led to 100% CPU and Off The Shelf Network Communication Software channel utilization on the Disk Management System servers. This caused an outage for Ordering because users were not able to be able to retrieve inventory data from Disk Management System." Moreover, with this example, the user's report did not include or indicate a statement of any recovery action taken.

TABLE 3

| Key Word | Systemic Root Cause | Observation Count | Systemic Count |
|---|---|---|---|
| Change | Change Management | 0 | 0 |
| Communicate | Change Management | 0 | |
| Enhancement | Change Management | 0 | |
| Feature | Change Management | 0 | |
| Modification | Change Management | 0 | |
| New | Change Management | 0 | |
| Update | Change Management | 0 | |
| Architecture | Design | 0 | 2 |
| Bug | Design | 0 | |
| Code | Design | 0 | |
| Configuration | Design | 0 | |
| Data | Design | 2 | |
| Decompose | Design | 0 | |
| Defect | Design | 0 | |
| Downstream | Design | 0 | |
| Error | Design | 0 | |
| Flow | Design | 0 | |
| Functional | Design | 0 | |
| Gap | Design | 0 | |
| Incomplete | Design | 0 | |
| Incorrect | Design | 0 | |
| Interface | Design | 0 | |
| Known | Design | 0 | |
| Latent | Design | 0 | |
| Memory | Design | 0 | |
| Missed | Design | 0 | |
| Requirement | Design | 0 | |
| Review | Design | 0 | |
| Table | Design | 0 | |
| Time | Design | 0 | |
| Upstream | Design | 0 | |
| Vague | Design | 0 | |
| Cable | External | 0 | 0 |
| Cut | External | 0 | |
| HVAC | External | 0 | |
| Power | External | 0 | |
| Weather | External | 0 | |
| Alarm | Fault Management | 0 | 0 |
| Classify | Fault Management | 0 | |
| Critical | Fault Management | 0 | |
| Delay | Fault Management | 0 | |
| Detect | Fault Management | 0 | |
| Fault | Fault Management | 0 | |
| Incorrect | Fault Management | 0 | |
| Monitoring | Fault Management | 0 | |
| Priority | Fault Management | 0 | |
| Slow | Fault Management | 0 | |
| Board | Hardware and User Maintenance | 0 | 1 |
| Connector | Hardware and User Maintenance | 0 | |
| CPU | Hardware and User Maintenance | 1 | |
| Inadequate | Hardware and User Maintenance | 0 | |
| Maintenance | Hardware and User Maintenance | 0 | |

TABLE 3-continued

| Key Word | Systemic Root Cause | Observation Count | Systemic Count |
|---|---|---|---|
| Module | Hardware and User Maintenance | 0 | |
| Monitoring | Hardware and User Maintenance | 0 | |
| PCB | Hardware and User Maintenance | 0 | |
| Remedial | Hardware and User Maintenance | 0 | |
| Preventative | Hardware and User Maintenance | 0 | |
| Scheduled | Hardware and User Maintenance | 0 | |
| Supply | Hardware and User Maintenance | 0 | |
| Back | Infrastructure Currency | 0 | 2 |
| Commercial | Infrastructure Currency | 0 | |
| Data | Infrastructure Currency | 2 | |
| Defect | Infrastructure Currency | 0 | |
| End | Infrastructure Currency | 0 | |
| Known | Infrastructure Currency | 0 | |
| Known | Infrastructure Currency | 0 | |
| Latent | Infrastructure Currency | 0 | |
| Level | Infrastructure Currency | 0 | |
| Life | Infrastructure Currency | 0 | |
| LINUX | Infrastructure Currency | 0 | |
| Middleware | Infrastructure Currency | 0 | |
| Operating | Infrastructure Currency | 0 | |
| OS | Infrastructure Currency | 0 | |
| Party | Infrastructure Currency | 0 | |
| Release | Infrastructure Currency | 0 | |
| Third | Infrastructure Currency | 0 | |
| UNIX | Infrastructure Currency | 0 | |
| Unsupported | Infrastructure Currency | 0 | |
| Upgrade | Infrastructure Currency | 0 | |
| Vendor | Infrastructure Currency | 0 | |
| High | Performance Management & Capacity Planning | 1 | 3 |
| Increase | Performance Management & Capacity Planning | 0 | |
| Insufficient | Performance Management & Capacity Planning | 0 | |
| Large | Performance Management & Capacity Planning | 0 | |
| Load | Performance Management & Capacity Planning | 0 | |
| Overload | Performance Management & Capacity Planning | 0 | |
| Response | Performance Management & Capacity Planning | 0 | |
| Slow | Performance Management & Capacity Planning | 0 | |
| Unexpected | Performance Management & Capacity Planning | 1 | |
| Unplanned | Performance Management & Capacity Planning | 0 | |
| Volume | Performance Management & Capacity Planning | 1 | |
| Access | Procedural | 0 | 0 |
| Entry | Procedural | 0 | |
| Followed | Procedural | 0 | |
| Implement | Procedural | 0 | |
| Incomplete | Procedural | 0 | |
| Incorrect | Procedural | 0 | |
| Input | Procedural | 0 | |
| Manual | Procedural | 0 | |
| Performed | Procedural | 0 | |
| Prevent | Procedural | 0 | |
| Procedural | Procedural | 0 | |
| Training | Procedural | 0 | |
| Untrained | Procedural | 0 | |
| User | Procedural | 0 | |
| Valid | Procedural | 0 | |
| | | 0 | |
| Alarm | Recovery Management | 0 | 0 |
| Critical | Recovery Management | 0 | |
| Delay | Recovery Management | 0 | |

TABLE 3-continued

| Key Word | Systemic Root Cause | Observation Count | Systemic Count |
|---|---|---|---|
| Incorrect | Recovery Management | 0 | |
| Priority | Recovery Management | 0 | |
| Recovery | Recovery Management | 0 | |
| Slow | Recovery Management | 0 | |
| Communication | Resource Availability | 0 | 1 |
| Disk | Resource Availability | 0 | |
| Insufficient | Resource Availability | 0 | |
| Limit | Resource Availability | 0 | |
| Lost | Resource Availability | 0 | |
| Memory | Resource Availability | 0 | |
| Monitoring | Resource Availability | 0 | |
| Network | Resource Availability | 0 | |
| Resources | Resource Availability | 1 | |
| Case | Test | 0 | 2 |
| Data | Test | 2 | |
| Environment | Test | 0 | |
| Escape | Test | 0 | |
| Facilities | Test | 0 | |
| Gap | Test | 0 | |
| Insufficient | Test | 0 | |
| Script | Test | 0 | |
| Test | Test | 0 | |
| Time | Test | 0 | |

Thus, as shown above in TABLE 3, the TEC 35 has determined total counts of keyword hits for each category of systemic root cause. Thus, with the example of TABLE 3, the TEC 35 has determined two keyword hits in "design," one keyword hit in "hardware and user maintenance," two keyword hits in "infrastructure currency," three keyword hits in "performance management & capacity planning," one keyword hit in "resource availability" and two keyword hits in "test."

As can be observed, with the example of TABLE 3, the "performance management & capacity planning" systemic root cause has the most keyword hits. Thus, in accordance with aspects of the invention, as described further below, with this example, a "performance management & capacity planning" problem will be identified as the probable systemic root cause of the disruption.

In embodiments, the keywords should be as orthogonal as possible. That is, ideally, each keyword would only correspond to a single root cause. However, it should be understood that, in embodiments, some keywords may correspond to more than on systemic root cause.

In embodiments, the list of exemplary keywords and their related systemic root causes may be stored in a database, e.g., the storage system 22B of FIG. 1. Moreover, the TEC 40 may also store the keyword hit count totals in a database, e.g., the storage system 22B of FIG. 1. Additionally, in embodiments, the list of exemplary keywords and their related systemic root causes may be preloaded, e.g., in the storage system 22B of FIG. 1, and may be updated, e.g., in real time.

Systemic Root Cause Spectrum Analyzer

In accordance with further aspects of the invention, the systemic root cause spectrum analyzer (SRCSA) 40 applies additional queries to the triggering event groups determined by the TEC 35 and determines the most likely systemic root cause for the triggering event group. As set forth above, a specific set of pre-determined, non-overlapping systemic root cause categories are defined for the enterprise, which correlate to the triggering event groups.

The SRCSA 40 accumulates the unique triggering events by systemic root cause. TABLE 4 is an exemplary table illustrating the accumulation of unique triggering events by systemic root cause.

TABLE 4

| Systemic Root Cause | Disruptions |
|---|---|
| Recovery Management | 20 |
| Test | 20 |
| Unknown | 20 |
| Procedural | 30 |
| Fault Management | 40 |
| Hardware and User Maintenance | 50 |
| External | 70 |
| Resource Availability | 70 |
| Change Management | 110 |
| Infrastructure Currency | 150 |
| Performance Management & Capacity Planning | 190 |
| Design | 230 |
| TOTAL | 1000 |

Moreover, in embodiments, the SRCSA 40 generates a systemic root cause power spectrum. In embodiments, the systemic root cause power spectrum comprises a pictorial representation of the unique triggering events by systemic root cause category. By grouping the unique triggering events by systemic root cause category, the systemic root cause power spectrum may identify the systemic root cause category having the most unique triggering events associated therewith. Thus, the SRCSA 40 may determine the most likely systemic root cause for the triggering event group.

Figure 8:
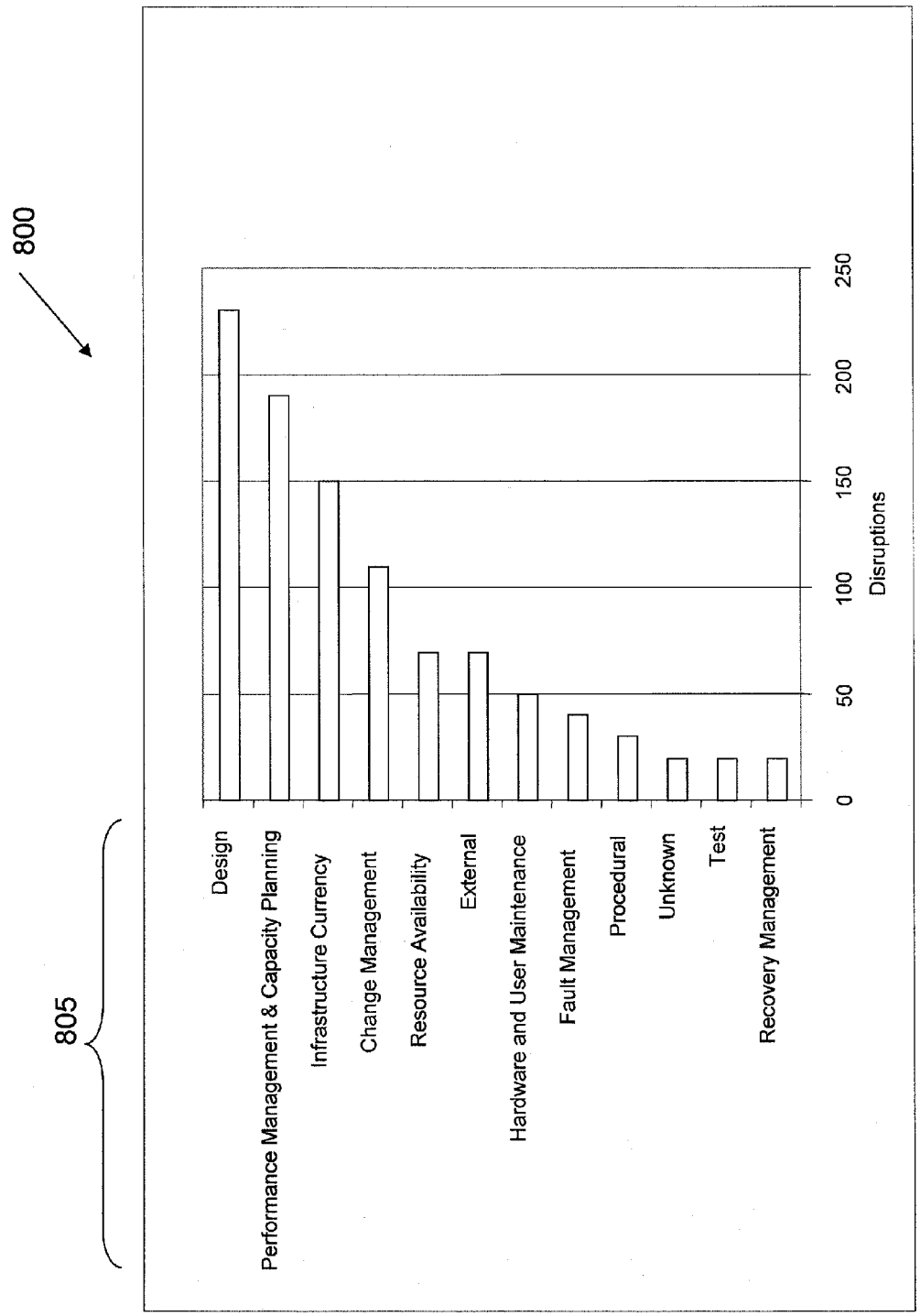
FIGS. 8-10 show exemplary SRCSA-generated systemic root cause power spectrums in accordance with aspects of the invention.

FIG. 8 shows an exemplary SRCSA-generated systemic root cause power spectrum 800 corresponding to TABLE 4 in accordance with aspects of the invention. As shown in FIG. 8, the systemic root cause power spectrum 800 quantifies the number of disruptions identified with each type of systemic root cause category 805. Thus, as can be observed with this exemplary systemic root cause power spectrum 800, the SRCSA 40 has identified "Design" as the likely systemic root cause category, as this category has the highest number of disruption triggering events associated therewith.

Additionally, in embodiments, the SRCSA 40 is operable to display an identification of a system experiencing a unique triggering event for each of the triggering events. That is, a particular triggering event may occur in a particular system of the enterprise. According to aspects of the invention, the SRCSA 40 may identify, for each triggering event associated with a particular systemic root cause (e.g., design), in what system each triggering event occurred. Thus, the SRCSA 40 may identify which part of the architecture of the enterprise may be responsible for the systemic root cause. According to aspects of the invention, identifying the system in which the triggering event occurred may aid in selecting an appropriate solution. For example, a solution for a given systemic root cause may be provided to only those identified systems in which the triggering events occurred. Or, for example, the correct solution may be determined to be for a related system which did not incur the triggering event but actually caused the disruption. In other words, the present invention includes the capability to determine the root cause and solution for a system different from the triggering system.

Figure 9:
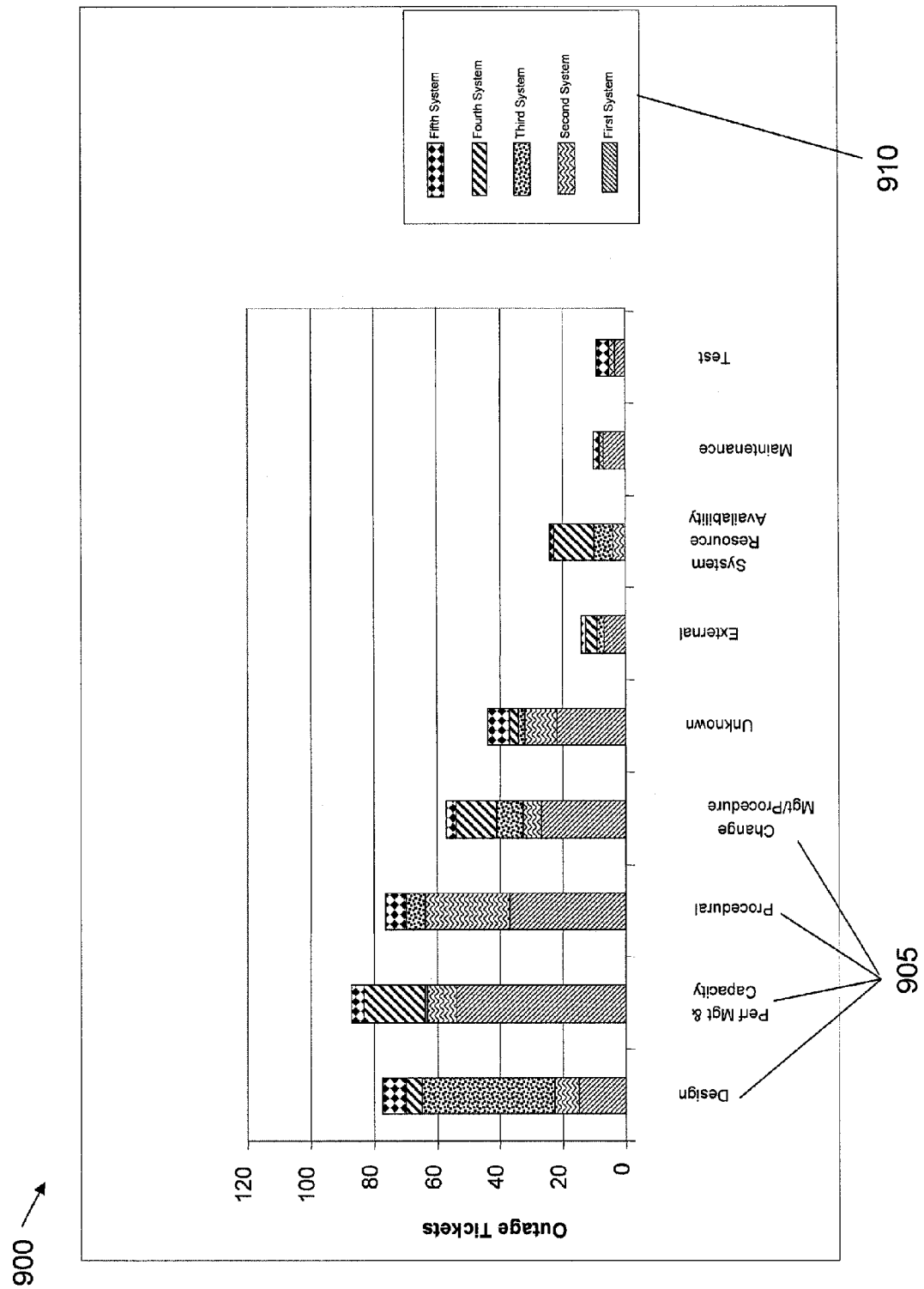

Thus, as shown in the exemplary SRCSA-generated systemic root cause power spectrum 900 of FIG. 9, for each systemic root cause category 905, the systemic root cause power spectrum 900 identifies those disruption triggering events attributable to each of the systems of the enterprise. The key 910 identifies the five systems associated with this exemplary enterprise. As should be understood by those skilled in the art, while this example includes five systems, the invention contemplates a given enterprise may have any number of systems.

As shown in FIG. 9, with this exemplary systemic root cause power spectrum 900, the SRCSA 40 has identified "Performance and Capacity Management" as the likely systemic root cause category, as this category has the highest number of disruption triggering events associated therewith. Moreover, the SRCSA 40 has additionally identified that a majority of the disruption triggering events for the "Performance and Capacity Management" systemic root cause category occurred in the first system. As such, as discussed below, this additional information that the majority of the disruption triggering events occurred in the first system may aid the SSS 45 in selecting an appropriate solution.

According to aspects of the invention, the SRCSA 40 is operable to further identify systemic root cause subcategories for the unique triggering events. TABLE 5 displays an exemplary list of systemic root cause categories and associated systemic root cause subcategories. Moreover, as shown in TABLE 5, the SRCSA 40 is operable to quantify the total number of disruptions for each category and is operable to quantify the number of disruptions in each subcategory. As should be understood, the list of exemplary systemic root cause categories and associated systemic root cause subcategories shown in TABLE 5 is an exemplary and non-exhaustive list, and the invention contemplates other systemic root cause categories and associated systemic root cause subcategories. In embodiments, the list of exemplary systemic root cause categories and associated systemic root cause subcategories may be stored in a database, e.g., the storage system 22B of FIG. 1.

TABLE 5

| Systemic Root Cause | Total Incidents | Sub Incidents |
|---|---|---|
| Change Management | 110 | |
| Change Management - Incomplete/Inaccurate Communication | | 50 |
| Change Management - No Communication | | 40 |
| Change Management - No Documentation | | 10 |
| Change Management - Incomplete/Inaccurate Documentation | | 10 |
| Design | 230 | |
| Design - Application Interface/Data | | 80 |
| Design - Network Interface | | 30 |
| Design - Third Party Software Integration | | 60 |
| Design - Requirements Trace Error | | 20 |
| Design - User Operations | | 40 |
| External | 70 | |
| External - Cable Cut | | 30 |
| External - Environment Loss | | 10 |
| External - Vendor error | | 10 |
| External - Power Loss | | 20 |
| Fault Management | 40 | |
| Fault Management - User Error | | 15 |
| Fault Management - Incomplete/Inaccurate Documentation | | 5 |
| Fault Management - Insufficient Recovery Resources | | 10 |
| Fault Management - No Documentation | | 10 |
| Hardware and User Maintenance | 50 | |
| H&UM - Insufficient Vendor Support | | 20 |
| H&UM - End of Life Equipment | | 10 |
| H&UM - Known Unrepairable Fault | | 5 |
| H&UM - Insufficient Spares | | 15 |
| Infrastructure Currency | 150 | |
| Infrastructure Currency - Not Latest Release | | 75 |
| Infrastructure Currency - End of Life | | 50 |
| Infrastructure Currency - Known Unrepairable Error | | 25 |
| Performance Management & Capacity Planning | 190 | |
| PM&CP - Inaccurate requirements | | 80 |
| PM&CP - No requirements | | 50 |
| PM&CP - Capacity not provided as required - Decision | | 40 |
| PM&CP - Capacity not provided as required - Error | | 20 |
| Procedural | 30 | |
| Procedural - User Error | | 15 |
| Procedural - No Procedure | | 6 |
| Procedural - Procedure Incorrect/Incomplete | | 9 |
| Recovery Management | 20 | |
| Recovery Management - User Error | | 6 |
| Recovery Management - Incomplete/Inaccurate Documentation | | 4 |
| Recovery Management - Insufficient Recovery Resources | | 6 |
| Recovery Management - No Documentation | | 2 |
| Recovery Management - Insufficient Root Cause Investigation | | 12 |
| Resource Availability | 70 | |
| RA - Incorrect Resource Estimate | | 5 |
| RA - Incorrect Resource Allocation | | 25 |
| RA - No Resource Metering | | 10 |
| RA - Insufficient Resource Metering | | 20 |
| RA - Insufficient Resources | | 10 |
| Test | 20 | |
| Test - Insufficient Environments | | 6 |
| Test - Insufficient Staff | | 2 |
| Test - Requirements Tracing Missing | | 2 |
| Test - Requirements Tracing Errors | | 6 |
| Test - Insufficient Procedures | | 4 |
| Unknown | 20 | |
| Unknown - Insufficient Disruption Detail | | 10 |
| Unknown - No Disruption Detail | | 10 |

Furthermore, in embodiments, the SRCSA 40 is operable to display a root cause spectrum analysis, which includes, e.g., a graphical depiction of the unique triggering events by systemic root cause category and systemic root cause subcategory. That is, for example, in embodiments, a particular systemic root cause category may include a number of systemic root cause subcategories.

Figure 10:
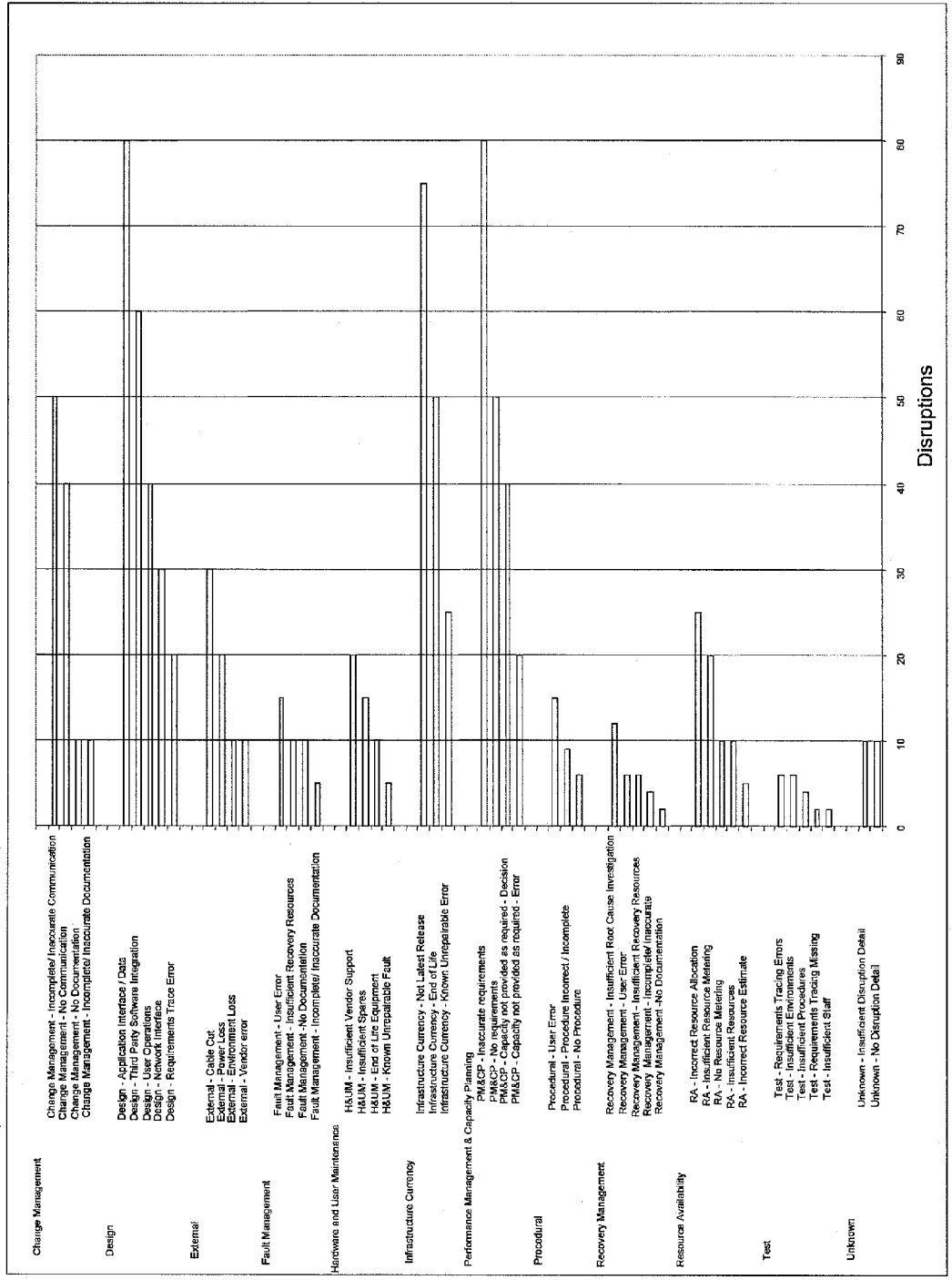

FIG. 10 shows an exemplary systemic root cause power spectrum 1000 which includes a graphical depiction of the unique triggering events by systemic root cause category and systemic root cause subcategory. As shown in FIG. 10, the systemic root cause power spectrum 1000 includes a number of systemic root cause categories 1005 and their associated systemic root cause subcategories 1010. Moreover, as shown in FIG. 10, the SRCSA 40 has quantified the number of disruptions for each systemic root cause category 1005 and their associated systemic root cause subcategories 1010.

Referring back to FIG. 4, according to further aspects of the invention, in embodiments, upon identifying the most likely systemic root cause category for the triggering event group, the SRCSA 40 may optionally coordinate with the TEC 35 to identify the most likely systemic root cause subcategory. More specifically, the SRCSA 40 may send to the TEC 35 (along path 430, which is dashed to denote that this is an optional step), an identification of a most likely root cause category. In accordance with aspects of the invention, the TEC 35 may utilize a list (e.g., similar to that shown in TABLE 1) of exemplary keywords and their related systemic root cause subcategories to determine a total number of those keywords in both the problem observation and the recovery action taken recorded in the report for each systemic root cause subcategory. In embodiments, by identifying a systemic root cause subcategory for a enterprise disruption, the SSS 40 may determine a more appropriate solution for the enterprise.

Systemic Solutions Selector

In accordance with aspects of the invention, the systemic solutions selector (SSS) 45 may contain or access a range or catalog of solutions for each systemic root cause. Moreover, the range of solutions may include characteristics for each of the solutions, including, for example, cost (e.g., high, medium or low, amongst other cost parameters) to remove the systemic disruption, time to remove the systemic disruption (e.g., short-term or long-term, amongst other time frames), and disruption removal effectiveness, amongst other parameters. In embodiments, a range of solutions for each systemic root cause may be stored in a database, e.g., storage system 22B of FIG. 1.

Furthermore, the SSS 45 is operable to output an optimal set of solutions to the enterprise. For example, an enterprise may be interested in a low-cost and/or short-term solution. Thus, the SSS 45 may be instructed to determine a low-cost and/or short-term solution for the enterprise. Based on the enterprise success criteria and constraints (such as, for example, financial limitations, needed speed to eliminate disruptions, etc.), the parameters and resulting optimal set of solutions can be applied across the entire enterprise. Additionally, the SSS 45 may be pre-loaded with historical solutions and may be dynamically updated, e.g., in real time, with additional solutions. In embodiments, the optimal set of solutions may include a single solution to address the enterprise-wide systemic root cause, or a solution set (e.g., more than one solution) to address the enterprise-wide systemic root cause.

TABLE 6 shows an exemplary table of solutions for systemic root causes that the SSS 45 may access to determine an optimal solution set. It should be understood that the table of solutions for systemic root causes is exemplary and that the invention contemplates additional solutions.

TABLE 6

| Systemic Root Cause | Low Impact Solution | High Impact Solution | REU | RTU | EDR | Cost |
|---|---|---|---|---|---|---|
| Change Management | Add Change Control Board | | 1 | 3 | 50% | 3 |
| Change Management | Increase change communication distribution to all areas | | 1 | 1 | 30% | 1 |
| Change Management | Increase change communication detail | | 1 | 1 | 20% | 1 |
| Design | Increased Number of Design Reviews by 1 | | 1 | 1 | 10% | 1 |
| Design | Increased Number of Design Reviews by 2 | | 1 | 1 | 10% | 1 |
| Design | Increased Number of Design Reviews by 3 | | 1 | 1 | 10% | 1 |
| Design | Increased Number of Design Reviews by 4 | | 1 | 1 | 10% | 1 |
| Design | Increased Number of Design Reviews by 5 | | 1 | 1 | 5% | 1 |
| Design | Single Software Architect to review all designs | | 1 | 3 | 20% | 3 |
| Design | | Increased use of software tools | 8 | 8 | 20% | 64 |
| Design | | Code audit of existing base to find potential latent defects | 10 | 6 | 15% | 60 |
| External | | Monitor external public & Utility communications in area | 5 | 4 | 40% | 20 |
| External | | Build central repository for all company utility actions | 20 | 10 | 20% | 200 |
| | | | | | | 0 |
| Fault Management | | Improve User Training | 8 | 8 | 20% | 64 |
| Fault Management | | Add automatic fault management scripts | 8 | 6 | 30% | 48 |
| Fault Management | | Improve fault recovery procedures | 8 | 6 | 20% | 48 |
| Fault Management | | Add knowledge-based fault management recovery | 10 | 10 | 30% | 100 |
| Hardware and User Maintenance | Reduce preventative maintenance intervals | | 3 | 3 | 25% | 9 |
| Hardware and User Maintenance | Increase number of preventative maintenance items | | 3 | 3 | 20% | 9 |
| Hardware and User Maintenance | | Increase level vendor support | 10 | 4 | 20% | 40 |
| Hardware and User Maintenance | | Increase user training | 8 | 4 | 15% | 32 |
| Hardware and User Maintenance | | Improve user maintenance procedures | 8 | 6 | 10% | 48 |
| Hardware and User Maintenance | | Increase amount of spares | 10 | 2 | 10% | 20 |
| Infrastructure Currency | | Upgrade all infrastructure | 15 | 6 | 90% | 90 |
| Infrastructure Currency | | Upgrade critical infrastructure | 10 | 6 | 50% | 60 |

TABLE 6-continued

| Systemic Root Cause | Low Impact Solution | High Impact Solution | REU | RTU | EDR | Cost |
|---|---|---|---|---|---|---|
| Performance Management & Capacity Planning | Increase frequency of volume estimates based on business changes (special offers, etc) | | 1 | 1 | 35% | 1 |
| Performance Management & Capacity Planning | | Build test environment that duplicates production to test against expected volumes | 10 | 10 | 15% | 100 |
| Performance Management & Capacity Planning | Model system and compute expected performance vs. volume | | 3 | 5 | 20% | 15 |
| Performance Management & Capacity Planning | | Conduct long-term, continuous operational tests | 10 | 10 | 15% | 100 |
| Performance Management & Capacity Planning | | Insert on-line, real-time, capacity measurement sensors in systems to determine remaining capacity continuously | 8 | 8 | 10% | 64 |
| Performance Management & Capacity Planning | Sample systems capacity at regular intervals to determine remaining capacity | | 2 | 2 | 5% | 4 |
| Procedural | | Convert manual procedures to automated scripts | 8 | 8 | 10% | 64 |
| Procedural | Require different staff to create manual procedure and to execute procedure | | 4 | 4 | 10% | 16 |
| Procedural | Require observer to verify operation of manual procedure | | 2 | 2 | 10% | 4 |
| Procedural | Improve security to restrict persons who can perform manual procedures | | 1 | 1 | 10% | 1 |
| Procedural | | Improve User Training | 8 | 8 | 30% | 64 |
| Procedural | Require any manual interaction to have step-by-step procedure with verification of step completion | | 3 | 2 | 10% | 6 |
| Procedural | | Add automatic error checking for manual entries | 10 | 8 | 20% | 80 |
| Recovery Management | | Add automatic recovery management scripts | 8 | 6 | 50% | 48 |
| Recovery Management | | Improve User Training | 8 | 8 | 30% | 64 |
| Recovery Management | Require observer to verify operation of recovery procedure | | 2 | 2 | 20% | 4 |
| Resource Availability | | Insert on-line, real-time, resource measurement sensors in systems to determine remaining resource continuously | 8 | 8 | 30% | 64 |
| Resource Availability | | Increase spare resources | 20 | 6 | 70% | 120 |
| Test | | Increase and Improve test environments to mirror production | 20 | 20 | 20% | 400 |
| Test | Improve test procedure detail | | 5 | 5 | 20% | 25 |
| Test | | Automate testing | 10 | 10 | 15% | 100 |
| Test | | Use tools to trace requirements to test steps and verify completeness | 10 | 10 | 20% | 100 |
| Test | Add 1 test review | | 1 | 1 | 10% | 1 |
| Test | Add 2 test reviews | | 1 | 1 | 5% | 1 |
| Test | Add 3 test reviews | | 1 | 1 | 5% | 1 |
| Test | Increase test scheduling detail | | 2 | 2 | 5% | 4 |
| | | Total | | | | 2376 |

As shown in TABLE 6, the exemplary solutions are divided into low impact solutions (e.g., those that may be easier to implement) and high impact solutions (e.g., those solutions that may be more extensive to implement). Additionally, for each of the solutions, TABLE 6 indicates relative effort units (REUs), relative time units (RTUs), an estimated disruption reduction (EDR) and a relative total cost. According to aspects of the invention, the REUs indicate an amount of effort required to implement the solution relative to the other solutions and the RTUs indicate an amount of time required to implement the solution relative to the other solutions. In embodiments, the RTUs may be, for example, weeks, such that a RTU of five indicates that the solution requires approximately five weeks to implement. However, the invention contemplates that, in embodiments, the RTU may represent any unit of time, e.g., a day, an hour, etc. The total relative cost for a solution may be determined by the product of the REU and the RTU. In embodiments, the relative total cost may be in units of, e.g., ten thousand dollars, such that, a relative total cost of ten indicates that the solution would require approximately one hundred thousand dollars. However, the invention contemplates that, in embodiments, the relative total cost may represent any unit of cost, e.g., one dollar, one hundred dollars, etc. The EDR indicates an estimated disruption reduction to be expected upon implementing the solution. As should be understood, the values for each solution's REU, RTU and EDR may be updated and/or adjusted, e.g., in real-time to more accurately reflect effort, time and estimated disruption reduction for the solution.

In embodiments, for example, if the SRCSA 40 determines that for a given enterprise, the systemic root cause is a "design" problem, then the SSS 45 is operable to determine an optimal solution from one of the solutions for a design systemic root cause. For example, the SSS 45 is operable to select, e.g., a low impact solution, for example, increased reviews, software architect to review all designs, and/or increased use of software tools, or a high impact solution, for example, performing a code audit of existing base to find potential latent defects. Additionally, in embodiments, the SSS 45 may select more than one solution for an identified systemic root cause.

TABLE 7 shows an exemplary table of solutions used by the SSS 45 to determine a solution in accordance with aspects of the invention. As shown in TABLE 7, for each of the systemic root causes of TABLE 6, the SSS 45 has correlated a total number of disruptions (or tickets which are written records of the disruptions), e.g., from TABLE 5. Additionally, as shown in TABLE 7, the SSS 45 has determined a reduction in disruptions for each of the solutions by calculating the product of the total tickets for that systemic root cause by the estimated reduction for each solution for that systemic root cause. In other words, TABLE 7 indicates the total possible reductions of disruptions for an enterprise were all of the solutions to be implemented. TABLE 7 also indicates an original order of these solutions, which may be used as a reference, as explained further below.

TABLE 7

| Original Order | Systemic Root Cause | Low Impact Solution | High Impact Solution | REU | RTU | Est. Reduction | Total Cost | Total Tickets | Reduction |
|---|---|---|---|---|---|---|---|---|---|
| 1 | Change Management | | | | | | | 110 | |
| 2 | Change Management | Add Change Control Board | | 1 | 3 | 50% | 3 | | 55 |
| 3 | Change Management | Increase change communication distribution to all areas | | 1 | 1 | 30% | 1 | | 33 |
| 4 | Change Management | Increase change communication detail | | 1 | 1 | 20% | 1 | | 22 |
| 5 | | | | | | | | | |
| 6 | Design | | | | | | | 230 | |
| 7 | Design | Increased Number of Design Reviews by 1 | | 1 | 1 | 10% | 1 | | 23 |
| 8 | Design | Increased Number of Design Reviews by 2 | | 1 | 1 | 10% | 1 | | 23 |
| 9 | Design | Increased Number of Design Reviews by 3 | | 1 | 1 | 10% | 1 | | 23 |
| 10 | Design | Increased Number of Design Reviews by 4 | | 1 | 1 | 10% | 1 | | 23 |
| 11 | Design | Increased Number of Design Reviews by 5 | | 1 | 1 | 5% | 1 | | 11.5 |
| 12 | Design | Single Software Architect to review all designs | | 1 | 3 | 20% | 3 | | 46 |
| 13 | Design | | Increased use of software tools | 8 | 8 | 20% | 64 | | 46 |
| 14 | Design | | Code audit of existing base to find potential latent defects | 10 | 6 | 15% | 60 | | 34.5 |
| 15 | | | | | | | | | |
| 16 | External | | | | | | | 70 | |

TABLE 7-continued

| Original Order | Systemic Root Cause | Low Impact Solution | High Impact Solution | REU | RTU | Est. Reduction | Total Cost | Total Tickets | Reduction |
|---|---|---|---|---|---|---|---|---|---|
| 17 | External | | Monitor external public & Utility communications in area | 5 | 4 | 40% | 20 | | 28 |
| 18 | External | | Build central repository for all company utility actions | 20 | 10 | 20% | 200 | | 14 |
| 19 | | | | | | | | | |
| 20 | Fault Management | | | | | | | 40 | |
| 21 | Fault Management | | Improve User Training | 8 | 8 | 20% | 64 | | 8 |
| 22 | Fault Management | | Add automatic fault management scripts | 8 | 6 | 30% | 48 | | 12 |
| 23 | Fault Management | | Improve fault recovery procedures | 8 | 6 | 20% | 48 | | 8 |
| 24 | Fault Management | | Add knowledge-based fault management recovery | 10 | 10 | 30% | 100 | | 12 |
| 25 | | | | | | | | | |
| 26 | Hardware and User Maintenance | | | | | | | 50 | |
| 27 | Hardware and User Maintenance | Reduce preventative maintenance intervals | | 3 | 3 | 25% | 9 | | 12.5 |
| 28 | Hardware and User Maintenance | Increase number of preventative maintenance items | | 3 | 3 | 20% | 9 | | 10 |
| 29 | Hardware and User Maintenance | | Increase level vendor support | 10 | 4 | 20% | 40 | | 10 |
| 30 | Hardware and User Maintenance | | Increase user training | 8 | 4 | 15% | 32 | | 7.5 |
| 31 | Hardware and User Maintenance | | Improve user maintenance procedures | 8 | 6 | 10% | 48 | | 5 |
| 32 | Hardware and User Maintenance | | Increase amount of spares | 10 | 2 | 10% | 20 | | 5 |
| 33 | | | | | | | | | |
| 34 | | | | | | | | | |
| 35 | Infrastructure Currency | | | | | | | 150 | |
| 36 | Infrastructure Currency | | Upgrade all infrastructure | 15 | 6 | 90% | 90 | | 135 |
| 37 | Infrastructure Currency | | Upgrade critical infrastructure | 10 | 6 | 50% | 60 | | 75 |
| 38 | | | | | | | | | |
| 39 | Performance Management & Capacity Planning | | | | | | | 190 | |
| 40 | Performance Management & Capacity Planning | Increase frequency of volume estimates based on business changes (special offers, etc) | | 1 | 1 | 35% | 1 | | 66.5 |
| 41 | Performance Management & Capacity Planning | | Build test environment that duplicates production to test against expected volumes | 10 | 10 | 15% | 100 | | 28.5 |

TABLE 7-continued

| Original Order | Systemic Root Cause | Low Impact Solution | High Impact Solution | REU | RTU | Est. Reduction | Total Cost | Total Tickets | Reduction |
|---|---|---|---|---|---|---|---|---|---|
| 42 | Performance Management & Capacity Planning | Model system and compute expected performance vs. volume | | 3 | 5 | 20% | 15 | | 38 |
| 43 | Performance Management & Capacity Planning | | Conduct long-term, continuous operational tests | 10 | 10 | 15% | 100 | | 28.5 |
| 44 | Performance Management & Capacity Planning | | Insert on-line, real-time, capacity measurement sensors in systems to determine remaining capacity continuously | 8 | 8 | 10% | 64 | | 19 |
| 45 | Performance Management & Capacity Planning | Sample systems capacity at regular intervals to determine remaining capacity | | 2 | 2 | 5% | 4 | | 9.5 |
| 46 | | | | | | | | | |
| 47 | Procedural | | | | | | | 30 | |
| 48 | Procedural | | Convert manual procedures to automated scripts | 8 | 8 | 10% | 64 | | 3 |
| 49 | Procedural | Require different staff to create manual procedure and to execute procedure | | 4 | 4 | 10% | 16 | | 3 |
| 50 | Procedural | Require observer to verify operation of manual procedure | | 2 | 2 | 10% | 4 | | 3 |
| 51 | Procedural | Improve security to restrict persons who can perform manual procedures | | 1 | 1 | 10% | 1 | | 3 |
| 52 | Procedural | | Improve User Training | 8 | 8 | 30% | 64 | | 9 |
| 53 | Procedural | Require any manual interaction to have step-by-step procedure with verification of step completion | | 3 | 2 | 10% | 6 | | 3 |
| 54 | Procedural | | Add automatic error checking for manual entries | 10 | 8 | 20% | 80 | | 6 |
| 55 | | | | | | | | | |
| 56 | Recovery Management | | | | | | | 20 | |
| 57 | Recovery Management | | Add automatic recovery management scripts | 8 | 6 | 50% | 48 | | 10 |

TABLE 7-continued

| Original Order | Systemic Root Cause | Low Impact Solution | High Impact Solution | REU | RTU | Est. Reduction | Total Cost | Total Tickets | Reduction |
|---|---|---|---|---|---|---|---|---|---|
| 58 | Recovery Management | | Improve User Training | 8 | 8 | 30% | 64 | | 6 |
| 59 | Recovery Management | Require observer to verify operation of recovery procedure | | 2 | 2 | 20% | 4 | | 4 |
| 60 | | | | | | | | | |
| 61 | Resource Availability | | | | | | | 70 | |
| 62 | Resource Availability | | Insert on-line, real-time, resource measurement sensors in systems to determine remaining resource continuously | 8 | 8 | 30% | 64 | | 21 |
| 63 | Resource Availability | | Increase spare resources | 20 | 6 | 70% | 120 | | 49 |
| 64 | | | | | | | | | |
| 65 | Test | | | | | | | 20 | |
| 66 | Test | | Increase and Improve test environments to mirror production | 20 | 20 | 20% | 400 | | 4 |
| 67 | Test | Improve test procedure detail | | 5 | 5 | 20% | 25 | | 4 |
| 68 | Test | | Automate testing | 10 | 10 | 15% | 100 | | 3 |
| 69 | Test | | Use tools to trace requirements to test steps and verify completeness | 10 | 10 | 20% | 100 | | 4 |
| 70 | Test | Add 1 test review | | 1 | 1 | 10% | 1 | | 2 |
| 71 | Test | Add 2 test reviews | | 1 | 1 | 5% | 1 | | 1 |
| 72 | Test | Add 3 test reviews | | 1 | 1 | 5% | 1 | | 1 |
| 73 | Test | Increase test scheduling detail | | 2 | 2 | 5% | 4 | | 1 |
| 74 | | | | | | | | | |
| | | | Totals | | | | 2373 | | |

As discussed above, an enterprise may not implement each identified solution. For example, it may be too costly to implement each identified solution. Additionally, it may be too time consuming to implement each identified solution. Accordingly, as discussed above, the SSS 45 is operable to optimize the solution set based on a user's constraints.

TABLE 8 shows an exemplary table of solutions, which the SSS 45 has ranked in order to determine an optimal solution set under cost constraints in accordance with aspects of the invention. That is, with this example, using TABLE 8, the SSS 45 is operable to determine a solution set which will provide the maximum reduction in number of disruptions for a particular cost.

TABLE 8

| Original Order | Systemic Root Cause | Low Impact Solution | High Impact Solution | REUs | RTUs | Est. Reduction | Total Cost | Total Disrupt. | Red. | Cum. Cost | CDR |
|---|---|---|---|---|---|---|---|---|---|---|---|
| 36 | Infrastructure Currency | | Upgrade all infrastructure | 15 | 6 | 90% | 90 | | 135 | 90 | 135 |
| 37 | Infrastructure Currency | | Upgrade critical infrastructure | 10 | 6 | 50% | 60 | | 75 | 150 | 210 |

TABLE 8-continued

| Original Order | Systemic Root Cause | Low Impact Solution | High Impact Solution | REUs | RTUs | Est. Reduction | Total Cost | Total Disrupt. | Red. | Cum. Cost | CDR |
|---|---|---|---|---|---|---|---|---|---|---|---|
| 40 | Performance Management & Capacity Planning | Increase frequency of volume estimates based on business changes (special offers, etc) | | 1 | 1 | 35% | 1 | | 66.5 | 151 | 277 |
| 2 | Change Management | Add Change Control Board | | 1 | 3 | 50% | 3 | | 55 | 154 | 332 |
| 63 | Resource Availability | | Increase spare resources | 20 | 6 | 70% | 120 | | 49 | 274 | 381 |
| 12 | Design | Single Software Architect to review all designs | | 1 | 3 | 20% | 3 | | 46 | 277 | 427 |
| 13 | Design | | Increased use of software tools | 8 | 8 | 20% | 64 | | 46 | 341 | 473 |
| 42 | Performance Management & Capacity Planning | Model system and compute expected performance vs. volume | | 3 | 5 | 20% | 15 | | 38 | 356 | 511 |
| 14 | Design | | Code audit of existing base to find potential latent defects | 10 | 6 | 15% | 60 | | 34.5 | 416 | 545 |
| 3 | Change Management | Increase change communication distribution to all areas | | 1 | 1 | 30% | 1 | | 33 | 417 | 578 |
| 41 | Performance Management & Capacity Planning | | Build test environment that duplicates production to test against expected volumes | 10 | 10 | 15% | 100 | | 28.5 | 517 | 607 |
| 43 | Performance Management & Capacity Planning | | Conduct long-term, continuous operational tests | 10 | 10 | 15% | 100 | | 28.5 | 617 | 635 |
| 17 | External | | Monitor external public & Utility communications in area | 5 | 4 | 40% | 20 | | 28 | 637 | 663 |
| 7 | Design | Increased Number of Design Reviews by 1 | | 1 | 1 | 10% | 1 | | 23 | 638 | 686 |
| 8 | Design | Increased Number of Design Reviews by 2 | | 1 | 1 | 10% | 1 | | 23 | 639 | 709 |
| 9 | Design | Increased Number of Design Reviews by 3 | | 1 | 1 | 10% | 1 | | 23 | 640 | 732 |
| 10 | Design | Increased Number of Design Reviews by 4 | | 1 | 1 | 10% | 1 | | 23 | 641 | 755 |
| 4 | Change Management | Increase change communication detail | | 1 | 1 | 20% | 1 | | 22 | 642 | 777 |
| 62 | Resource Availability | | Insert on-line, real-time, resource measurement sensors in | 8 | 8 | 30% | 64 | | 21 | 706 | 798 |

TABLE 8-continued

| Original Order | Systemic Root Cause | Low Impact Solution | High Impact Solution | REUs | RTUs | Est. Reduction | Total Cost | Total Disrupt. | Red. | Cum. Cost | CDR |
|---|---|---|---|---|---|---|---|---|---|---|---|
| 44 | Performance Management & Capacity Planning | | systems to determine remaining resource continuously Insert on-line, real-time capacity measurement sensors in systems to determine remaining capacity continuously | 8 | 8 | 10% | 64 | | 19 | 770 | 817 |
| 18 | External | | Build central repository for all company utility actions | 20 | 10 | 20% | 200 | | 14 | 970 | 831 |
| 27 | Hardware and User Maintenance | Reduce preventative maintenance intervals | | 3 | 3 | 25% | 9 | | 12.5 | 979 | 844 |
| 22 | Fault Management | | Add automatic fault management scripts | 8 | 6 | 30% | 48 | | 12 | 1027 | 856 |
| 24 | Fault Management | | Add knowledge-based fault management recovery | 10 | 10 | 30% | 100 | | 12 | | |
| 11 | Design | Increased Number of Design Reviews by 5 | | 1 | 1 | 5% | 1 | | 11.5 | | |
| 28 | Hardware and User Maintenance | Increase number of preventative maintenance items | | 3 | 3 | 20% | 9 | | 10 | | |
| 29 | Hardware and User Maintenance | | Increase level vendor support | 10 | 4 | 20% | 40 | | 10 | | |
| 57 | Recovery Management | | Add automatic recovery management scripts | 8 | 6 | 50% | 48 | | 10 | | |
| 45 | Performance Management & Capacity Planning | Sample systems capacity at regular intervals to determine remaining capacity | | 2 | 2 | 5% | 4 | | 9.5 | | |
| 52 | Procedural | | Improve User Training | 8 | 8 | 30% | 64 | | 9 | | |
| 23 | Fault Management | | Improve fault recovery procedures | 8 | 6 | 20% | 48 | | 8 | | |
| 21 | Fault Management | | Improve User Training | 8 | 8 | 20% | 64 | | 8 | | |
| 30 | Hardware and User Maintenance | | Increase user training | 8 | 4 | 15% | 32 | | 7.5 | | |
| 58 | Recovery Management | | Improve User Training | 8 | 8 | 30% | 64 | | 6 | | |
| 54 | Procedural | | Add automatic error checking for manual entries | 10 | 8 | 20% | 80 | | 6 | | |
| 32 | Hardware and User Maintenance | | Increase amount of spares | 10 | 2 | 10% | 20 | | 5 | | |
| 31 | Hardware and User Maintenance | | Improve user maintenance procedures | 8 | 6 | 10% | 48 | | 5 | | |

TABLE 8-continued

| Original Order | Systemic Root Cause | Low Impact Solution | High Impact Solution | REUs | RTUs | Est. Reduction | Total Cost | Total Disrupt. Red. | Cum. Cost | CDR |
|---|---|---|---|---|---|---|---|---|---|---|
| 59 | Recovery Management | Require observer to verify operation of recovery procedure | | 2 | 2 | 20% | 4 | 4 | | |
| 67 | Test | Improve test procedure detail | | 5 | 5 | 20% | 25 | 4 | | |
| 69 | Test | | Use tools to trace requirements to test steps and verify completeness | 10 | 10 | 20% | 100 | 4 | | |
| 66 | Test | | Increase and Improve test environments to mirror production | 20 | 20 | 20% | 400 | 4 | | |
| 51 | Procedural | Improve security to restrict persons who can perform manual procedures | | 1 | 1 | 10% | 1 | 3 | | |
| 50 | Procedural | Require observer to verify operation of manual procedure | | 2 | 2 | 10% | 4 | 3 | | |
| 53 | Procedural | Require any manual interaction to have step-by-step procedure with verification of step completion | | 3 | 2 | 10% | 6 | 3 | | |
| 49 | Procedural | Require different staff to create manual procedure and to execute procedure | | 4 | 4 | 10% | 16 | 3 | | |
| 48 | Procedural | | Convert manual procedures to automated scripts | 8 | 8 | 10% | 64 | 3 | | |
| 68 | Test | | Automate testing | 10 | 10 | 15% | 100 | 3 | | |
| 70 | Test | Add 1 test review | | 1 | 1 | 10% | 1 | 2 | | |
| 71 | Test | Add 2 test reviews | | 1 | 1 | 5% | 1 | 1 | | |
| 72 | Test | Add 3 test reviews | | 1 | 1 | 5% | 1 | 1 | | |
| 73 | Test | Increase test scheduling detail | | 2 | 2 | 5% | 4 | 1 | | |
| 1 5 | Change Management | | | | | | | | 110 | |
| 6 15 | Design | | | | | | | | 230 | |
| 16 19 | External | | | | | | | | 70 | |
| 20 25 | Fault Management | | | | | | | | 40 | |
| 26 33 | Hardware and User Maintenance | | | | | | | | 50 | |
| 34 | | | | | | | | | | |

TABLE 8-continued

| Original Order | Systemic Root Cause | Low Impact Solution | High Impact Solution | REUs | RTUs | Est. Reduction | Total Cost | Total Disrupt. | Red. | Cum. Cost | CDR |
|---|---|---|---|---|---|---|---|---|---|---|---|
| 35 | Infrastructure Currency | | | | | | | 150 | | | |
| 38 | | | | | | | | | | | |
| 39 | Performance Management & Capacity Planning | | | | | | | 190 | | | |
| 46 | | | | | | | | | | | |
| 47 | Procedural | | | | | | | 30 | | | |
| 55 | | | | | | | | | | | |
| 56 | Recovery Management | | | | | | | 20 | | | |
| 60 | | | | | | | | | | | |
| 61 | Resource Availability | | | | | | | 70 | | | |
| 64 | | | | | | | | | | | |
| 65 | Test | | | | | | | 20 | | | |
| | Totals | | | | | | | 2226 | | | |

More specifically, TABLE 8 shows the solutions of TABLE 7 ranked according to the values in the reduction column. Thus, as shown in TABLE 8, the original order column indicates how the SSS 45 has reordered the according to the values in the reduction column. Additionally, as shown in TABLE 8, the SSS 45 has determined a cumulative cost for implementing each additional solution. The SSS 45 determines a cumulative cost by summing the total cost for a particular solution with the cumulative cost of the solutions above the particular solution in the ranked list. TABLE 8 also indicates a cumulative disruption reduction (CDR). The SSS 45 determines a CDR by summing the total disruption reductions for a particular solution with the cumulative disruption reductions of the solutions above the particular solution in the ranked list.

In accordance with aspects of the invention, for example, assuming a cost constraint of one thousand cost units, the SSS 45 may determine, using TABLE 8, that for a cost constraint of one thousand relative cost units, approximately eighty-five percent of the disruptions may be eliminated. That is, as shown above in TABLE 8, for a cost of approximately one-thousand-twenty-seven relative cost units, eight-hundred-fifty six disruptions of the one thousand disruptions can be eliminated. Thus, with this example, the SSS 45 may select for implementation all of the solutions in TABLE 8 up to the "Add automatic fault management scripts" solution of the "Fault management" systemic root cause in order to maximize the reduction of disruptions while meeting the cost constraints.

TABLE 9 shows an exemplary table of solutions, which the SSS 45 has ranked to determine an optimal solution set under time constraints in accordance with aspects of the invention. That is, with this example, using TABLE 9, the SSS 45 is operable to determine a solution set which will provide the maximum reduction in number of disruptions for a particular amount of time.

More specifically, TABLE 9 shows the solutions of TABLE 7 ranked according to the values in the relative time units (RTU) column from lowest to highest. Thus, as shown in TABLE 9, the original order column indicates how the SSS 45 has reordered the according to the values in the RTU column. Additionally, as shown in TABLE 9, the SSS 45 has determined a cumulative disruption reduction (CDR). The SSS 45 determines a CDR by summing the total disruption reductions for a particular solution with the cumulative disruption reductions of the solutions above the particular solution in the ranked list.

TABLE 9

| Original Order | Systemic Root Cause | Low Impact Solution | High Impact Solution | REU | RTU | Est. Reduction | Total Cost | Total Disrup. | Disrup. Red. | Cum. Cost | CDR |
|---|---|---|---|---|---|---|---|---|---|---|---|
| 40 | Performance Management & Capacity Planning | Increase frequency of volume estimates based on business changes (special offers, etc) | | 1 | 1 | 35% | 1 | | 66.5 | | 66.5 |
| 3 | Change Management | Increase change communication distribution to all areas | | 1 | 1 | 30% | 1 | | 33 | | 99.5 |
| 10 | Design | Increased Number of Design Reviews by 4 | | 1 | 1 | 10% | 1 | | 23 | | 123 |
| 9 | Design | Increased Number of Design Reviews by 3 | | 1 | 1 | 10% | 1 | | 23 | | 146 |

TABLE 9-continued

| Original Order | Systemic Root Cause | Low Impact Solution | High Impact Solution | REU | RTU | Est. Reduction | Total Cost | Total Disrup. | Disrup. Red. | Cum. Cost | CDR |
|---|---|---|---|---|---|---|---|---|---|---|---|
| 8 | Design | Increased Number of Design Reviews by 2 | | 1 | 1 | 10% | 1 | | 23 | | 169 |
| 7 | Design | Increased Number of Design Reviews by 1 | | 1 | 1 | 10% | 1 | | 23 | | 192 |
| 4 | Change Management | Increase change communication detail | | 1 | 1 | 20% | 1 | | 22 | | 214 |
| 11 | Design | Increased Number of Design Reviews by 5 | | 1 | 1 | 5% | 1 | | 11.5 | | 225 |
| 51 | Procedural | Improve security to restrict persons who can perform manual procedures | | 1 | 1 | 10% | 1 | | 3 | | 228 |
| 70 | Test | Add 1 test review | | 1 | 1 | 10% | 1 | | 2 | | 230 |
| 71 | Test | Add 2 test reviews | | 1 | 1 | 5% | 1 | | 1 | | 231 |
| 72 | Test | Add 3 test reviews | | 1 | 1 | 5% | 1 | | 1 | | 232 |
| 45 | Performance Management & Capacity Planning | Sample systems capacity at regular intervals to determine remaining capacity | | 2 | 2 | 5% | 4 | | 9.5 | | 242 |
| 32 | Hardware and User Maintenance | | Increase amount of spares | 10 | 2 | 10% | 20 | | 5 | | 247 |
| 59 | Recovery Management | Require observer to verify operation of recovery procedure | | 2 | 2 | 20% | 4 | | 4 | | 251 |
| 50 | Procedural | Require observer to verify operation of manual procedure | | 2 | 2 | 10% | 4 | | 3 | | 254 |
| 53 | Procedural | Require any manual interaction to have step-by-step procedure with verification of step completion | | 3 | 2 | 10% | 6 | | 3 | | 257 |
| 73 | Test | Increase test scheduling detail | | 2 | 2 | 5% | 4 | | 1 | | 258 |
| 2 | Change Management | Add Change Control Board | | 1 | 3 | 50% | 3 | | 55 | | 313 |
| 12 | Design | Single Software Architect to review all designs | | 1 | 3 | 20% | 3 | | 46 | | 359 |
| 27 | Hardware and User Maintenance | Reduce preventative maintenance intervals | | 3 | 3 | 25% | 9 | | 12.5 | | 371 |

TABLE 9-continued

| Original Order | Systemic Root Cause | Low Impact Solution | High Impact Solution | REU | RTU | Est. Reduction | Total Cost | Total Disrup. | Disrup. Red. | Cum. Cost | CDR |
|---|---|---|---|---|---|---|---|---|---|---|---|
| 28 | Hardware and User Maintenance | Increase number of preventative maintenance items | | 3 | 3 | 20% | 9 | | 10 | | 381 |
| 17 | External | | Monitor external public & Utility communications in area | 5 | 4 | 40% | 20 | | 28 | | 409 |
| 29 | Hardware and User Maintenance | | Increase level vendor support | 10 | 4 | 20% | 40 | | 10 | | 419 |
| 30 | Hardware and User Maintenance | | Increase user training | 8 | 4 | 15% | 32 | | 7.5 | | 427 |
| 49 | Procedural | Require different staff to create manual procedure and to execute procedure | | 4 | 4 | 10% | 16 | | 3 | | 430 |
| 42 | Performance Management & Capacity Planning | Model system and compute expected performance vs. volume | | 3 | 5 | 20% | 15 | | 38 | | 468 |
| 67 | Test | Improve test procedure detail | | 5 | 5 | 20% | 25 | | 4 | | 472 |
| 36 | Infrastructure Currency | | Upgrade all infrastructure | 15 | 6 | 90% | 90 | | 135 | | |
| 37 | Infrastructure Currency | | Upgrade critical infrastructure | 10 | 6 | 50% | 60 | | 75 | | |
| 63 | Resource Availability | | Increase spare resources | 20 | 6 | 70% | 120 | | 49 | | |
| 14 | Design | | Code audit of existing base to find potential latent defects | 10 | 6 | 15% | 60 | | 34.5 | | |
| 22 | Fault Management | | Add automatic fault management scripts | 8 | 6 | 30% | 48 | | 12 | | |
| 57 | Recovery Management | | Add automatic recovery management scripts | 8 | 6 | 50% | 48 | | 10 | | |
| 23 | Fault Management | | Improve fault recovery procedures | 8 | 6 | 20% | 48 | | 8 | | |
| 31 | Hardware and User Maintenance | | Improve user maintenance procedures | 8 | 6 | 10% | 48 | | 5 | | |
| 13 | Design | | Increased use of software tools | 8 | 8 | 20% | 64 | | 46 | | |
| 62 | Resource Availability | | Insert on-line, real-time, resource measurement sensors in systems to determine remaining resource continuously | 8 | 8 | 30% | 64 | | 21 | | |

TABLE 9-continued

| Original Order | Systemic Root Cause | Low Impact Solution | High Impact Solution | REU | RTU | Est. Reduction | Total Cost | Total Disrup. | Disrup. Red. | Cum. Cost | CDR |
|---|---|---|---|---|---|---|---|---|---|---|---|
| 44 | Performance Management & Capacity Planning | | Insert on-line, real-time, capacity measurement sensors in systems to determine remaining capacity continuously | 8 | 8 | 10% | 64 | | 19 | | |
| 52 | Procedural | | Improve User Training | 8 | 8 | 30% | 64 | | 9 | | |
| 21 | Fault Management | | Improve User Training | 8 | 8 | 20% | 64 | | 8 | | |
| 58 | Recovery Management | | Improve User Training | 8 | 8 | 30% | 64 | | 6 | | |
| 54 | Procedural | | Add automatic error checking for manual entries | 10 | 8 | 20% | 80 | | 6 | | |
| 48 | Procedural | | Convert manual procedures to automated scripts | 8 | 8 | 10% | 64 | | 3 | | |
| 43 | Performance Management & Capacity Planning | | Conduct long-term, continuous operational tests | 10 | 10 | 15% | 100 | | 28.5 | | |
| 41 | Performance Management & Capacity Planning | | Build test environment that duplicates production to test against expected volumes | 10 | 10 | 15% | 100 | | 28.5 | | |
| 18 | External | | Build central repository for all company utility actions | 20 | 10 | 20% | 200 | | 14 | | |
| 24 | Fault Management | | Add knowledge-based fault management recovery | 10 | 10 | 30% | 100 | | 12 | | |
| 69 | Test | | Use tools to trace requirements to test steps and verify completeness | 10 | 10 | 20% | 100 | | 4 | | |
| 68 | Test | | Automate testing | 10 | 10 | 15% | 100 | | 3 | | |
| 66 | Test | | Increase and Improve test environments to mirror production | 20 | 20 | 20% | 400 | | 4 | | |
| 1 | Change Management | | | | | | | 110 | | | |
| 5 | | | | | | | | | | | |
| 6 | Design | | | | | | | 230 | | | |
| 15 | | | | | | | | | | | |
| 16 | External | | | | | | | 70 | | | |
| 19 | | | | | | | | | | | |
| 20 | Fault Management | | | | | | | 40 | | | |
| 25 | | | | | | | | | | | |
| 26 | Hardware and User Maintenance | | | | | | | 50 | | | |
| 33 | | | | | | | | | | | |
| 34 | | | | | | | | | | | |

TABLE 9-continued

| Original Order | Systemic Root Cause | Low Impact Solution | High Impact Solution | REU | RTU | Est. Reduction | Total Cost | Total Disrup. | Disrup. Red. | Cum. Cost | CDR |
|---|---|---|---|---|---|---|---|---|---|---|---|
| 35 | Infrastructure Currency | | | | | | | 150 | | | |
| 38 | | | | | | | | | | | |
| 39 | Performance Management & Capacity Planning | | | | | | | 190 | | | |
| 46 | | | | | | | | | | | |
| 47 | Procedural | | | | | | | 30 | | | |
| 55 | | | | | | | | | | | |
| 56 | Recovery Management | | | | | | | 20 | | | |
| 60 | | | | | | | | | | | |
| 61 | Resource Availability | | | | | | | 70 | | | |
| 64 | | | | | | | | | | | |
| 65 | Test | | | | | | | 20 | | | |
| | Totals | | | | | | | 2374 | | | |

In accordance with aspects of the invention, for example, assuming a time constraint of five time units, the SSS 45 may determine, using TABLE 9, that for a time constraint of five relative time units, approximately forty-seven percent of the disruptions may be eliminated. That is, as shown above in TABLE 9, for a time of five relative time units, four-hundred-seventy-two disruptions of the one thousand disruptions can be eliminated. Thus, with this example, the SSS 45 may select for implementation all of the solutions in TABLE 9 up to the "Improve test procedure detail" solution of the "Test" systemic root cause in order to maximize the reduction of disruptions while meeting the time constraints.

Moreover, as should be understood by those of ordinary skill in the art, as solutions may be implemented concurrently, with a time constraint analysis, determining a cumulative relative time units may unnecessary to determine a solution set. That is, in contrast to the cost constraint example shown above in TABLE 8, in which each additional solution incurs some associated cost, with the time constraint example of TABLE 9, solutions may be implemented concurrently such that each additional solution may not require additional time. Thus, in embodiments, with a time constraint analysis, the SSS 45 may not determine a cumulative time for implementing the solution set.

According to further aspects of the invention, the SSS 45 may determine an optimal solution set according to additional constraints. For example, the SSS 45 may determine an optimal solution set based on a time constraint combined with a cost constraint. Additionally, in embodiments, the SSS 45 may determine an optimal solution set, for example, based on reducing a number of disruptions or a percentage of disruptions.

As shown in FIG. 4, the SSS 45 is operable to send an optimal enterprise solution set to both the transformer 50 and the enterprise disruptions estimator 55, as explained further below.

Transformer

According to further aspects of the invention, the transformer 50 integrates the optimal set of solutions received from the SSS 45 to create a set of enterprise transformations. In embodiments, the transformations may comprise both the solutions to correct the existing disruptions in the enterprise and the broader changes required in the enterprise operation to avoid new disruptions in the future.

More specifically, in embodiments, the transformer 50 is operable to create tasks and/or instructions to a user, e.g., a technician, to implement the solutions (as determined by the SSS 45) to fix the disruptions of the enterprise. In embodiments, for example, instructions may include "control logins," "provide training," and/or "increase capacity," amongst other instructions.

Furthermore, the transformer 50 is operable to determine the order and schedule to implement the optimal solutions. For example, in embodiments, the transformer 50 may instruct "do all Design Solutions first by mm/dd/yyyy" or "do Y Design and Y Performance solutions by mm/dd/yyyy)."

Additionally, the transformer 50 is operable to compare the repairs being done directly after the triggering events to the optimal solution set and determine if any optimum solutions have already been implemented as a repair. In this manner, for example, the transformer 50 may prevent solutions that are duplicates of repairs from being carried forward to the Enterprise.

The enterprise disruptions estimator (EDE) 55 integrates the solution disruption removal efficiencies to determine the expected number of future disruptions by observable triggering events over time. That is, the EDE 55 determines an estimated expected number and/or type (e.g., category) of disruptions in light of the implemented solution set determined by the SSS 45.

For example, within a given enterprise there may be one thousand disruptions. The SSS 45 may indicate a number of solutions in order to prevent all one thousand disruptions. However, the one thousand disruptions may include, for example, nine-hundred-ninety-eight disruptions that are relatively easy to prevent or remedy and two disruptions that would be very burdensome, e.g., very expensive, to implement. Thus, for example, if a user indicated that a low impact solution is desired, the SSS tool 45 may indicate an optimal solution of remedying the nine-hundred-ninety-eight disruptions, while not addressing the two disruptions that would be very burdensome to implement.

Accordingly, upon receiving the optimal enterprise solution set, the EDE 55 is operable to determine an expected number of enterprise disruptions once the optimal enterprise solution set has been implemented in the enterprise. Thus, with the above example, the EDE tool 55 would determine an estimate of an expectation of two disruptions, as the optimal enterprise solution should remedy nine-hundred-ninety-eight disruptions of the one thousand disruptions. As explained further below, the EDE 55 may be used to adjust the S-J filter 30 and/or adjust the SSS 45, e.g., in real time, to, for example, optimize the solution set.

Error Detector

In accordance with further aspects of the invention, the error detector 60 is operable to detect errors (or disruptions) and determine a difference between expected or estimated disruption removal (determined by the EDE 55) and actual disruption removal by triggering event subsequent to the solution set being implemented within the enterprise. That is the error detector 60 provides a feedback loop to compare the expected or estimated disruption removal and actual disruption removal in real-time.

Moreover, according to aspects of the invention, the error detector differences may be used to adjust the S-J filter coefficients to, e.g., select a more optimal sample for a next analysis cycle. Moreover, the sample adjustment may adapt the enterprise to finding new or changing disruptions in the enterprise. Also, in embodiments, differences detected by the error detector 60 may be used to adapt the solution set to new or changing disruptions in the enterprise.

According to further aspects of the invention, in addition to eliminating disruptions after systems are in operation, the present invention may be used to direct the design of new systems and avoid future latent disruptions as the new systems are built and deployed. For example, in embodiments, with the new-system-design adaptation, the inputs to the S-J filter 30 would be, for example, the requirements and/or the key architecture characteristics for the new system. Additionally, the TEC 35 may be used to correlate key words in the requirements and/or architecture to systemic causes where future disruptions could occur. Moreover, with the new-system-design adaptation, the SRCSA 40 functions as described above. Furthermore, the SSS 45 defines areas to be considered and/or addressed in "designing, building, testing, and logistics planning" of the new system. The SSS 45 may utilize, for example, cost, time, and/or number of future disruptions, etc. as selection parameters. Additionally, the Transformer 50 is operable to, for example, prioritize, sequence and schedule the Solutions based on the development and delivery schedule of the new system.

Figure 11:
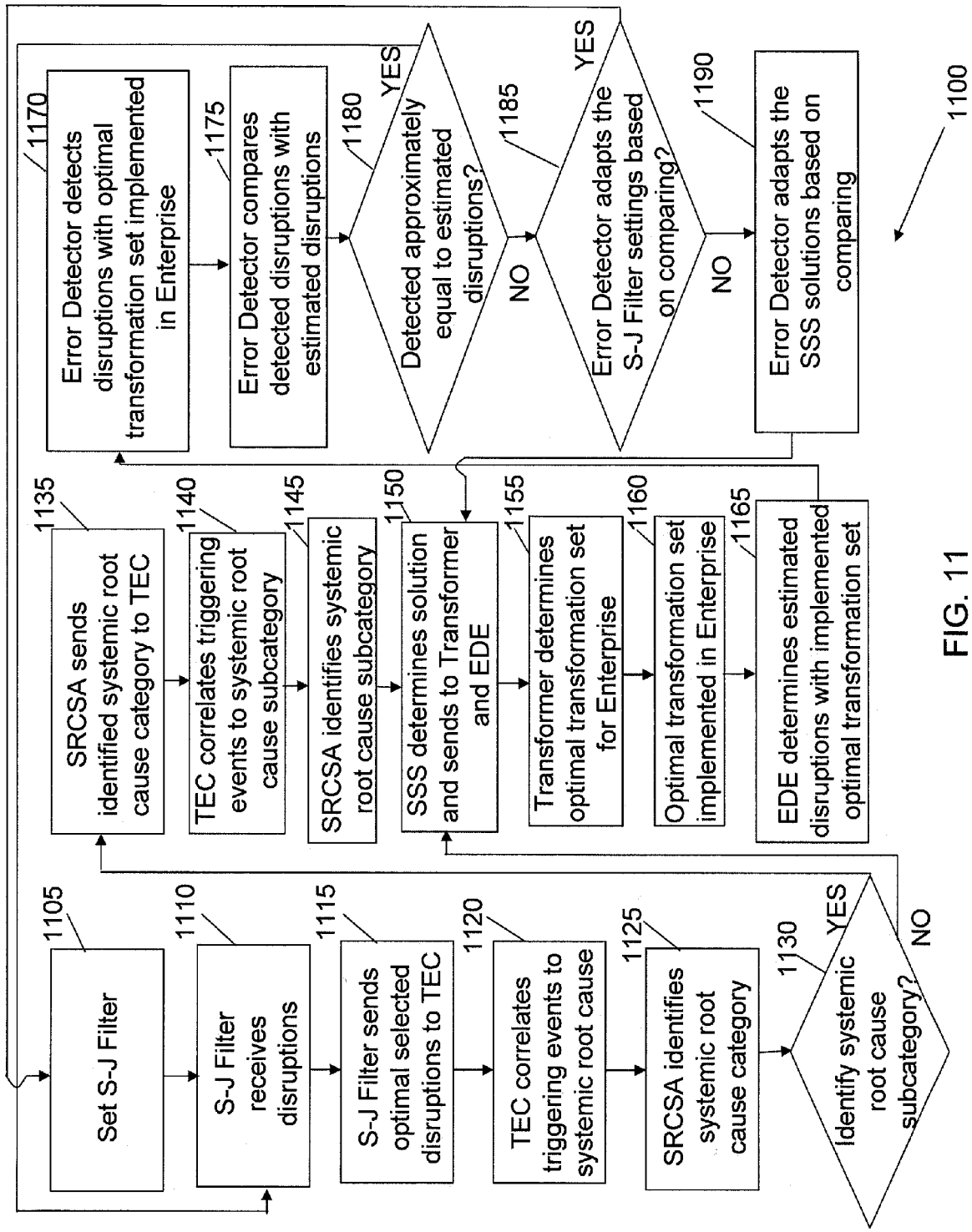
FIG. 11 shows an exemplary flow for practicing aspects of the invention.

FIG. 11 shows an exemplary flow 1100 for performing aspects of the invention. As shown in FIG. 11, at step 1105, the S-J filter settings are set for the enterprise. At step 1110, the S-J filter receives the action reports (e.g., indicating the disruption and any recovery action taken) for the disruptions in the enterprise. At step 1115, the S-J filter sends the optimal selected disruptions to the TEC. At step 1120, the TEC correlates the optimal selected disruption triggering events to systemic root causes.

At step 1125, the SRCSA identifies the systemic root cause category for the enterprise. At step 1130, the SRCSA determines whether to identify a systemic root cause subcategory for the enterprise based on, e.g., user input. If, at step 1130, a determination is made to not identify a systemic root cause subcategory, the process proceeds to step 1150, discussed below. If, at step 1130, a determination is made to identify a systemic root cause subcategory, at step 1135, the SRCSA sends the identified root cause category to the TEC. At step 1140, the TEC correlates the optimal selected disruption triggering events to a systemic root cause subcategory. At step 1145, the SRCSA identifies a systemic root cause subcategory, and the process proceeds to step 1150.

At step 1150, the SSS determines an optimal enterprise solution set and sends the optimal enterprise solution set to the transformer and the EDE. At step 1155, the transformer determines an optimal transformation set for the enterprise. At step 1160, the optimal transformation set is implemented in the enterprise, e.g., by a user or technician.

At step 1165, the EDE determines estimated disruptions (e.g., frequency and/or type) for the enterprise upon implementing the optimal transformation set. At step 1170, the error detector detects the disruptions in the enterprise with the optimal transformation set implemented in the enterprise. At step 1175, the error detector compares the detected disruptions with the estimated disruptions.

At step 1180, the error detector determines whether the detected disruptions are approximately equal to the estimated disruptions (e.g., in frequency and/or type). If, at step 1180, the error detector determines that the detected disruptions are approximately equal to the estimated disruptions, the process returns to step 1110 for further receiving of enterprise disruptions. If, at step 1180, the error detector determines that the detected disruptions are not approximately equal to the estimated disruptions, then the process proceeds to step 1085.

At step 1185, a determination is made as to whether the error detector should adapt the S-J filter settings based on the comparing. In embodiments, the determination may be made by as user, e.g., a technician. In further embodiments, step 1185 may be performed automatically, based on, e.g., a percentage of error detected by the error detector outside a user-configurable range. If, at step 1185, a determination is made to adapt the S-J filter settings based on the comparing, the process continues at step 1105, where the error detector adjusts the S-J filter settings. Additionally, in embodiments, the S-J filter settings may be adjusted, for example, manually, e.g., by a user or technician, to adaptively tailor the determined enterprise solution set. If, at step 1185, a determination is made to not adapt the S-J filter settings based on the comparing, the process continues at step 1190. At step 1190, the error detector adapts the SSS solutions based on the comparing of the estimated disruptions and the detected disruptions, and the process continues at step 1150.

Additionally, the invention contemplates that, in embodiments, upon a determination that the estimated disruptions are not approximately equal to the detected disruptions, the error detector (or a user) may adapt both the S-J filter settings and the SSS solutions based on the comparison of the estimated disruptions and the detected disruptions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   receive disruption data for an enterprise;
   determine optimal selected disruption data from the received disruption data;
   correlate triggering events of the optimal selected disruption data to one or more systemic root cause categories;
   identify a systemic root cause based on the triggering events of the optimal selected disruption data;
   determine an optimal enterprise solution set based on the identified systemic root cause;
   determine an optimal enterprise transformation set based on the optimal enterprise solution set; and
   output the optimal enterprise transformation set for implementing the optimal enterprise transformation set in the enterprise.

2. The method of claim 1, further comprising implementing the optimal enterprise transformation set in the enterprise.

3. The method of claim 1, further comprising determining estimated disruptions based on an implementation of the optimal enterprise transformation set in the enterprise.

4. The method of claim 3, further comprising comparing the estimated disruptions with actual disruptions detected upon the implementation of the optimal enterprise transformation set in the enterprise.

5. The method of claim 4, wherein when the comparing the estimated disruptions with the actual disruptions indicates the estimated disruptions do not approximate the actual disruptions, the method further comprising adjusting at least one of:
   the optimal selected disruption data; and
   the optimal enterprise solution set.

6. The method of claim 1, wherein the disruption data comprises one or more reports of disruptions, each report including an indication of at least one of a problem observation of a disruption and a recovery action taken in response to the disruption.

7. The method of claim 1, wherein the optimal selected disruption data is determined based on at least one of a time scale and an architectural juxtaposition of the enterprise.

8. The method of claim 1, wherein the optimal selected disruption data is selected from a portion of the disruption data from one or more particular systems of the enterprise.

9. The method of claim 1, wherein the correlating triggering events of the optimal selected disruption data to one or more systemic root cause categories comprises comparing one or more keywords of the optimal selected disruption data to a list correlating the one or more keywords to one or more systemic root cause categories.

10. The method of claim 9, wherein the identifying the systemic root cause for the triggering events of the optimal selected disruption data comprises:
    determining a total number of the one or more keywords associated with the one or more systemic root cause categories for each of the one or more systemic root cause categories; and
    designating a systemic root cause category of the one or more systemic root cause categories having a largest total number of the one or more keywords as the identified systemic root cause.

11. The method of claim 1, wherein the determining the optimal enterprise solution set based on the identified systemic root cause comprises correlating the identified systemic root cause with a catalog of solutions to identify one or more solutions to address the identified systemic root cause.

12. The method of claim 11, wherein the determining the optimal enterprise solution set based on the identified systemic root cause further comprises receiving an indication of at least one of:
    cost characteristics of the optimal enterprise solution set;
    implementation characteristics of the optimal enterprise solution set; and
    disruption removal effectiveness characteristics of the optimal enterprise solution set.

13. The method of claim 11, wherein the determining the optimal enterprise solution set based on the identified systemic root cause further comprises:
    receiving a solution constraint; and
    selecting one or more solutions of the catalog of solutions which address the identified systemic root cause within the solution constraint.

14. The method of claim 11, further comprising at least one of:
    pre-loading the catalog of solutions with historical solutions; and
    updating the catalog of solutions in real-time with additional solutions.

15. The method of claim 1, wherein the determining the optimal enterprise transformation set based on the optimal enterprise solution set comprises creating at least one of tasks and instructions to a user to implement the optimal enterprise solution set.

16. The method of claim 1, wherein a service provider at least one of creates, maintains, deploys and supports the computer infrastructure.

17. The method of claim 1, wherein steps are provided by a service provider on a subscription, advertising, and/or fee basis.

18. A system, comprising:
    a scale & juxtaposition (S-J) filter operable to receive disruption data for an enterprise and determine optimal selected disruption data from the received disruption data;
    a triggering events correlator (TEC) operable to correlate triggering events of the optimal selected disruption data to one or more systemic root cause categories;
    a systemic root cause spectrum analyzer (SRCSA) operable to identify a systemic root cause for the triggering events of the optimal selected disruption data;
    a systemic solutions selector (SSS) operable to determine an optimal enterprise solution set based on the identified systemic root cause; and
    a transformer operable to:
      determine an optimal enterprise transformation set based on the optimal enterprise solution set; and
      output the optimal enterprise transformation set for an implementation of the optimal enterprise transformation set in the enterprise.

19. The system of claim 18, further comprising:
    an enterprise disruptions estimator (EDE) operable to determine estimated disruptions based on the implementation of the optimal enterprise solution set in the enterprise; and an error detector operable to compare the estimated disruptions with actual disruptions detected upon the implementation of the optimal enterprise transformation set in the enterprise.

20. The system of claim 19, wherein when the comparing the estimated disruptions with actual disruptions indicates the estimated disruptions do not approximate the actual disruptions, and the error detector is further operable to adjust or indicate an adjustment at least one of:
the optimal selected disruption data; and
the optimal enterprise solution set.

21. The system of claim 18, wherein the TEC is further operable to correlate triggering events of the optimal selected disruption data to one or more systemic root cause subcategories.

22. The system of claim 18, wherein the SRCSA is further operable to provide a root cause spectrum analysis indicating a total number of disruption triggering events associated with each systemic root cause category.

23. The system of claim 22, wherein the root cause spectrum analysis provides at least one of:
an indication of which systems of the enterprise are experiencing the disruption triggering events for each of the systemic root cause categories; and
an indication of one or more systemic root cause subcategories.

24. A computer program product comprising a computer usable storage medium having readable program code embodied in the storage medium, the computer program product includes at least one component operable to:
receive disruption data for an enterprise;
determine optimal selected disruption data from the received disruption data;
correlate triggering events of the optimal selected disruption data to one or more systemic root cause categories;
identify a systemic root cause based on the triggering events of the optimal selected disruption data;
determine an optimal enterprise solution set based on the identified systemic root cause;
determine an optimal enterprise transformation set based on the optimal enterprise solution set; and
output the optimal enterprise transformation set for implementing the optimal enterprise transformation set in the enterprise.

25. A method comprising:
providing a computer infrastructure operable to:
receive disruption data for an enterprise;
determine optimal selected disruption data from the received disruption data;
correlate triggering events of the optimal selected disruption data to one or more systemic root cause categories;
identify a systemic root cause based on the triggering events of the optimal selected disruption data;
determine an optimal enterprise solution set based on the identified systemic root cause;
determine an optimal enterprise transformation set based on the optimal enterprise solution set;
output the optimal enterprise transformation set for implementing the optimal enterprise transformation set in the enterprise;
determine estimated disruptions based on an implementation of the optimal enterprise transformation set in the enterprise;
compare the estimated disruptions with actual disruptions detected upon the implementation of the optimal enterprise transformation set in the enterprise,
wherein when the comparing the estimated disruptions with the actual disruptions indicates the estimated disruptions do not approximate the actual disruptions, the method further comprising adjusting at least one of:
the optimal selected disruption data; and
the optimal enterprise solution set.

* * * * *